(12) United States Patent
Sawai

(10) Patent No.: US 9,552,071 B2
(45) Date of Patent: *Jan. 24, 2017

(54) INFORMATION PROCESSING APPARATUS, INFORMATION PROCESSING METHOD AND COMPUTER PROGRAM

(71) Applicant: Sony Corporation, Tokyo (JP)

(72) Inventor: Kunihito Sawai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 14/533,502

(22) Filed: Nov. 5, 2014

(65) Prior Publication Data

US 2015/0054856 A1    Feb. 26, 2015

Related U.S. Application Data

(63) Continuation of application No. 14/152,511, filed on Jan. 10, 2014, now Pat. No. 8,902,163, which is a (Continued)

(30) Foreign Application Priority Data

Aug. 26, 2009    (JP) ................................. 2009-195038

(51) Int. Cl.
    *G06F 3/0485*    (2013.01)
    *G06F 3/01*    (2006.01)
    (Continued)

(52) U.S. Cl.
    CPC .............. *G06F 3/017* (2013.01); *G06F 3/033* (2013.01); *G06F 3/0304* (2013.01); (Continued)

(58) Field of Classification Search
    CPC ................. H03J 1/0025; H04N 5/4403; H04N 2005/4408
    See application file for complete search history.

(56) References Cited

U.S. PATENT DOCUMENTS 5,748,185 A *  5/1998  Stephan ................ G06F 3/0488
                                                    345/157
6,587,093 B1    7/2003  Shaw et al.
                        (Continued)

FOREIGN PATENT DOCUMENTS

CN          1343330 A      4/2002
CN        101042300 A      9/2007
                        (Continued)

OTHER PUBLICATIONS

Office Action issued on Feb. 26, 2013 in Japanese Patent Application No. 2009-195038.
(Continued)

*Primary Examiner* — Grant Sitta
*Assistant Examiner* — Amen Bogale
(74) *Attorney, Agent, or Firm* — Oblon, McClelland, Maier & Neustadt, L.L.P.

(57) ABSTRACT

There is provided an information processing apparatus according to the present invention including a detection unit for detecting a moving direction and a moving amount of a finger on an operation panel, and a moving control unit for changing the moving amount of an object on a display unit for a finger's unit moving amount depending on the moving direction of the finger which moves the object displayed on the display unit. According to the present invention, the moving amount of the object within a display region changes based on the moving direction of the finger to be operated on the operation panel. In this manner, the object moving amount is corrected depending on the finger moving direction, thereby eliminating the factors for reducing the operability during the object moving operation and improving the operability.

18 Claims, 21 Drawing Sheets

Related U.S. Application Data continuation of application No. 12/845,253, filed on Jul. 28, 2010, now Pat. No. 8,669,947.

(51) Int. Cl.

| | | |
|---|---|---|
| *G06F 3/033* | (2013.01) | |
| *G06F 3/041* | (2006.01) | |
| *G06F 3/048* | (2013.01) | |
| *G06F 3/0354* | (2013.01) | |
| *G06F 3/0484* | (2013.01) | |
| *G06F 3/03* | (2006.01) | |
| *G06F 3/0338* | (2013.01) | |

(52) U.S. Cl.
CPC ........ *G06F 3/0338* (2013.01); *G06F 3/03543* (2013.01); *G06F 3/03547* (2013.01); *G06F 3/041* (2013.01); *G06F 3/048* (2013.01); *G06F 3/0485* (2013.01); *G06F 3/04845* (2013.01); *G06F 2203/0338* (2013.01)

(56) References Cited

U.S. PATENT DOCUMENTS

| | | | |
|---|---|---|---|
| 7,825,910 B2 | 11/2010 | Won | |
| 8,031,180 B2 | 10/2011 | Miyamoto et al. | |
| 8,902,163 B2* | 12/2014 | Sawai | G06F 3/033 345/156 |
| 2002/0130839 A1* | 9/2002 | Wallace | G06F 3/0317 345/157 |
| 2008/0024444 A1 | 1/2008 | Abe et al. | |
| 2008/0048997 A1 | 2/2008 | Gillespie et al. | |
| 2008/0168382 A1* | 7/2008 | Louch | G06F 9/4443 715/781 |
| 2008/0273755 A1 | 11/2008 | Hildreth | |
| 2010/0137031 A1 | 6/2010 | Griffin et al. | |
| 2010/0175027 A1* | 7/2010 | Young | G06F 3/04883 715/830 |
| 2012/0098836 A1* | 4/2012 | Kim | G06F 3/0483 345/473 |
| 2014/0149922 A1* | 5/2014 | Hauser | G06F 3/0485 715/784 |

FOREIGN PATENT DOCUMENTS

| | | |
|---|---|---|
| CN | 101464746 A | 6/2009 |
| JP | 9-330173 | 12/1997 |
| JP | 2004-102985 | 4/2004 |
| JP | 2005-128987 | 5/2005 |
| JP | 2008-33695 | 2/2008 |
| JP | 2009-110155 | 5/2009 |

OTHER PUBLICATIONS

Office Action issued on Nov. 12, 2013 in Japanese Patent Application No. 2009-195038.

\* cited by examiner

FIG. 1
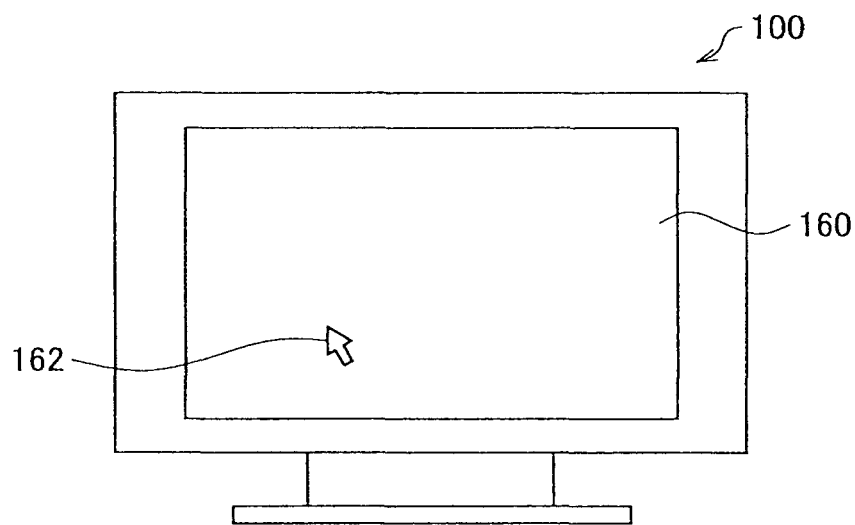
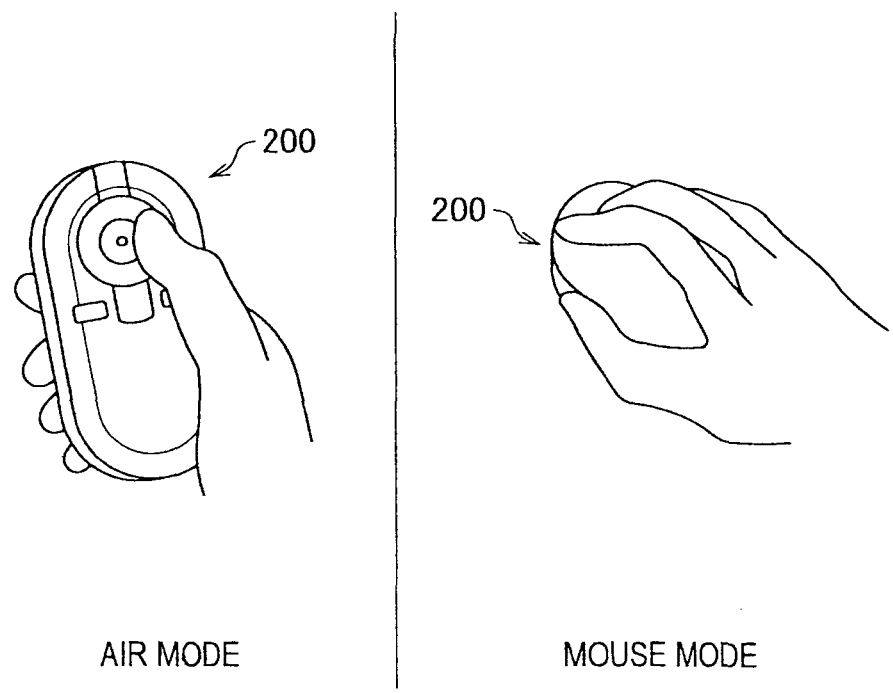
AIR MODE | MOUSE MODE

FIG. 14
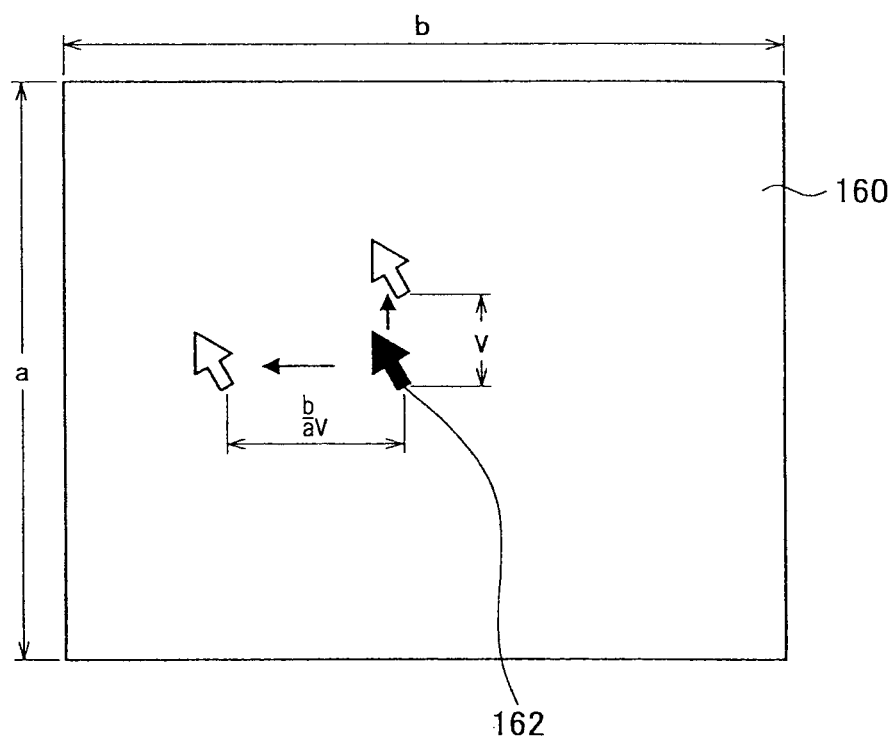
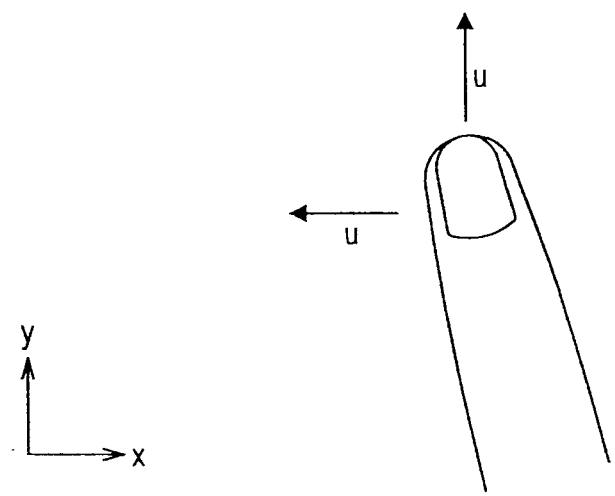

INFORMATION PROCESSING APPARATUS, INFORMATION PROCESSING METHOD AND COMPUTER PROGRAM

CROSS-REFERENCE TO RELATED APPLICATIONS

This application is a continuation of U.S. Ser. No. 14/152,511, filed Jan. 10, 2014, which is a continuation of U.S. Ser. No. 12/845,253 filed Jul. 28, 2010 (now U.S. Pat. No. 8,669,947), which claims priority under 35 U.S.C. 119 to Japanese Patent Application No. 2009-195038, filed on Aug. 26, 2009; the entire contents of which are incorporated herein by reference.

BACKGROUND OF THE INVENTION

Field of the Invention

The present invention relates to an information processing apparatus, an information processing method and a computer program, and more specifically to an information processing apparatus, an information processing method and a computer program for controlling a moving operation of objects displayed on a display unit.

Description of the Related Art

When information such as images or text data is to be displayed on a display device, all the information may not be displayed within a display region depending on a size of the display region or the amount of information. Scroll display capable of moving the display contents in the vertical and horizontal directions and displaying desired information is applied to the information, thereby confirming all the information within the same display region. A scroll bar is dragged through a pointing device such as mouse so that the display contents of the information subjected to scroll display can be moved in the moving direction of the scroll bar. Alternatively, the scroll operation can be performed also by pressing a cursor key on a keyboard.

There is proposed a scrolling apparatus capable of adjusting the amount of scroll for moving the display contents in the scroll operation in order to improve the operability (for example, Japanese Patent Application Laid-Open No. 2008-33695). The scrolling apparatus described in Japanese Patent Application Laid-Open No. 2008-33695 can finely or quickly and roughly scroll by changing the amount of scroll depending on an operation position of the device for performing the scroll operation.

SUMMARY OF THE INVENTION

However, there was an issue that a user needs to perform the scroll operation in consideration of the operation position in the above scrolling apparatus in order to adjust the amount of scroll, which lacks in intuitive operability.

In light of the foregoing, it is desirable to provide a novel and improved information processing apparatus, information processing method and computer program capable of realizing higher operability through intuitive input.

According to an embodiment of the present invention, there is provided an information processing apparatus including a detection unit for detecting a moving direction and a moving amount of a finger on an operation panel, and a moving control unit for changing the moving amount of an object on a display unit for a unit moving amount of the finger according to the moving direction of the finger which moves the object displayed on the display unit.

According to the present invention, the moving amount of object within a display region changes based on the moving direction of a finger to be operated on an operation panel. In this manner, the moving amount of object is corrected depending on the finger moving direction, thereby eliminating the factors for reducing the operability during the object moving operation and improving the operability.

Here, the moving control unit may change the moving amount of the object based on a movable distance in a movable direction of the object in a display region of the display unit.

Moreover, the moving control unit may set the moving amount of the object when a finger is moved in the lateral direction to be larger than the moving amount of the object when the finger is moved in the longitudinal direction for the movements in the longitudinal direction from the tip of the finger toward the root thereof and in the lateral direction as a finger width direction perpendicular to the longitudinal direction.

Furthermore, the moving control unit may change a ratio of the moving amount of the object in each moving direction depending on a finger moving speed.

Moreover, the moving control unit may continuously move the object depending on the finger moving speed just before non-input state when entering the non-input state where the moving direction and the moving amount of the finger are not input from the detection unit.

Furthermore, the moving control unit may decide a moving direction of a second object moving in a predetermined direction depending on the movement of the object based on the moving direction and the moving amount of the object decided from the moving direction and the moving amount of the finger.

Moreover, when moving direction recognition regions are set by the moving direction and the moving amount of the object, respectively, for the moving direction of the second object, and the moving control unit may change the moving direction recognition regions depending on the moving status of the second object.

Furthermore, an operation panel on which the detection unit may be arranged is formed to be curved in the longitudinal direction and to be linear in the lateral direction.

According to another embodiment of the present invention, there is provided an information processing method, including the steps of detecting a moving direction and a moving amount of a finger on an operation panel, and changing the moving amount of an object on a display unit for a finger's unit moving amount depending on the moving direction of the finger which moves the object displayed on the display unit.

According to another embodiment of the present invention, there is provided a computer program for causing a computer to function as the information processing apparatus described above. The computer program is stored in a storage device included in the computer, and it is read and executed by a CPU included in the computer, thereby causing the computer to function as the information processing apparatus described above. Moreover, there is also provided a computer readable recording medium in which the computer program is stored. The recording medium may be a magnetic disk, an optical disk and the like, for example.

According to the embodiment of the present invention described above, there can be provided an information processing apparatus, information processing method and computer program capable of realizing higher operability through intuitive input.

BRIEF DESCRIPTION OF THE DRAWINGS

FIG. 1 is an explanatory diagram showing a schematic configuration of an input unit according to an embodiment of the present invention;

FIG. 14 is an explanatory diagram for describing correction of an object moving amount based on a ratio of a display region;

DETAILED DESCRIPTION OF THE EMBODIMENTS

Figure 2:
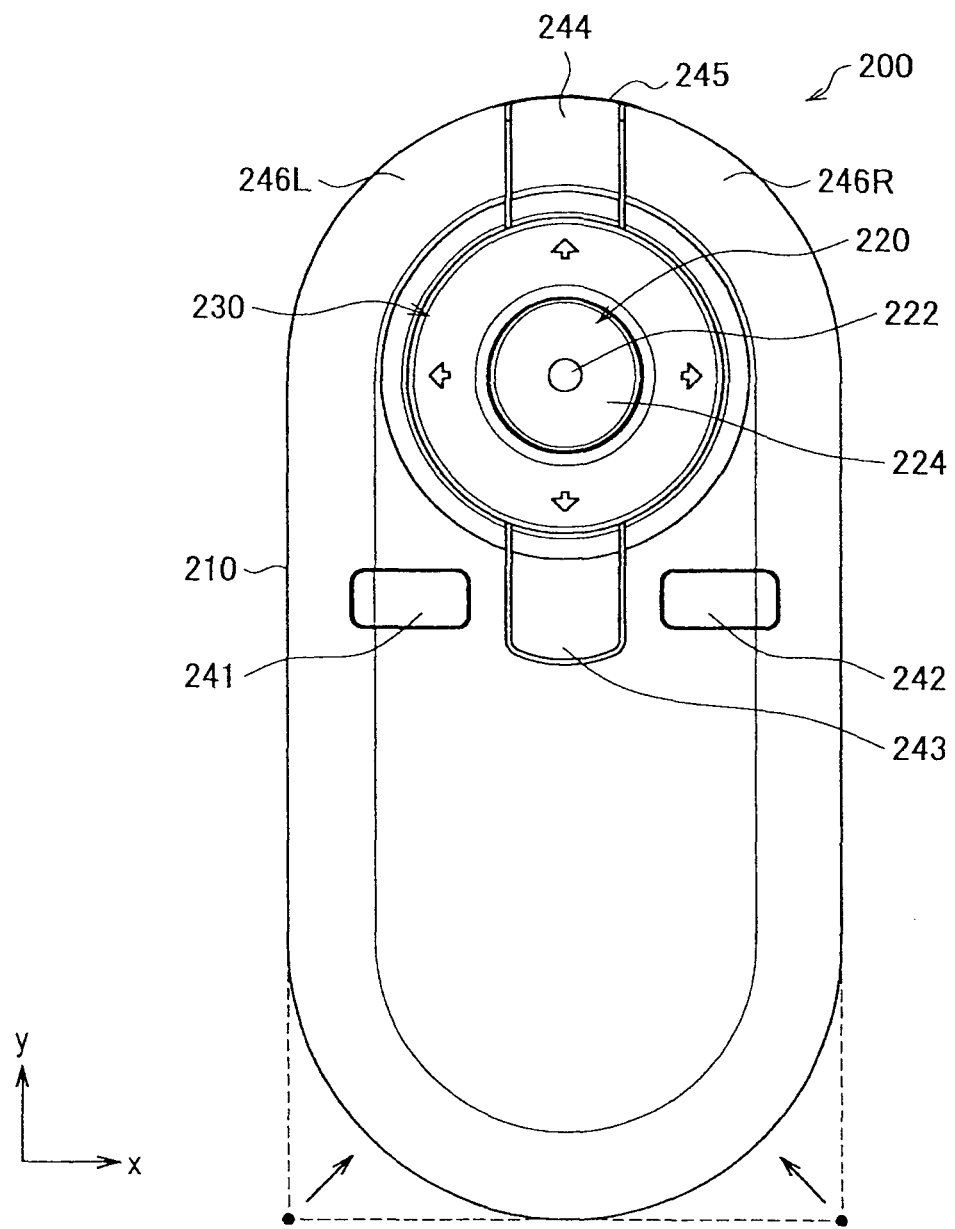
FIG. 2 is a top view showing an input device according to the embodiment.

Hereinafter, preferred embodiments of the present invention will be described in detail with reference to the appended drawings. Note that, in this specification and the appended drawings, structural elements that have substantially the same function and configuration are denoted with the same reference numerals, and repeated explanation of these structural elements is omitted.

In addition, the description will be made in the following order.

1. Outline of information processing apparatus
2. Specific configuration of information processing apparatus
3. Operation controlling method by operation control unit <1. Outline of Information Processing Apparatus>

[Configuration Example of Information Processing Apparatus]

A configuration example of an input unit as an information processing apparatus according to the embodiment will be first described with reference to FIG. 1. FIG. 1 is an explanatory diagram showing a schematic configuration of the input unit according to the embodiment.

The input unit according to the embodiment includes a control device for performing operation control based on input information and an input device for inputting the input information. In the embodiment, as one example of the input unit, an input unit including a control device 100 for controlling a cursor 162 displayed in a display region 160 of a display device and an input device 200 for inputting input information for operating the cursor 162 will be described as shown in FIG. 1.

The input device 200 according to the embodiment includes two modes such as a mouse mode for functioning as a mouse and an air mode for functioning as a remote controller as shown in FIG. 1. In the mouse mode, a user moves the input device 200 on a desk similar to a typical mouse or presses a button thereby to input the input information. On the other hand, in the air mode, the user presses a button with his/her thumb or slides the thumb on an operation region while holding the input device 200 on his/her hand, thereby inputting the input information. The mouse mode and the air mode of the input device 200 can be switched through the pressing of the switch button (numeral 245 in FIG. 2) provided on the input device 200, for example.

The input information input from the input device 200 is sent to the control device 100 to be processed. The control device 100 is provided in a processing apparatus for processing information to be displayed on the display device such as personal computer, a display device including a control unit, or the input device 200 itself. The control device 100 can move an object such as the cursor 162 or the display contents, which are being displayed in the display region 160, based on the input information.

A detailed configuration of the input device 200 in the input unit and an object operation controlling method by the control device will be described below. In the following, it is assumed that the control device 100 is provided in a processing device such as personal computer which is different from the input device 200, and performs the object operation control based on the input information sent from the input device 200 for reflecting the same on the display of the display device.

<2. Specific Configuration of Information Processing Apparatus>

[Configuration and Function of Input Device]

Figure 3:
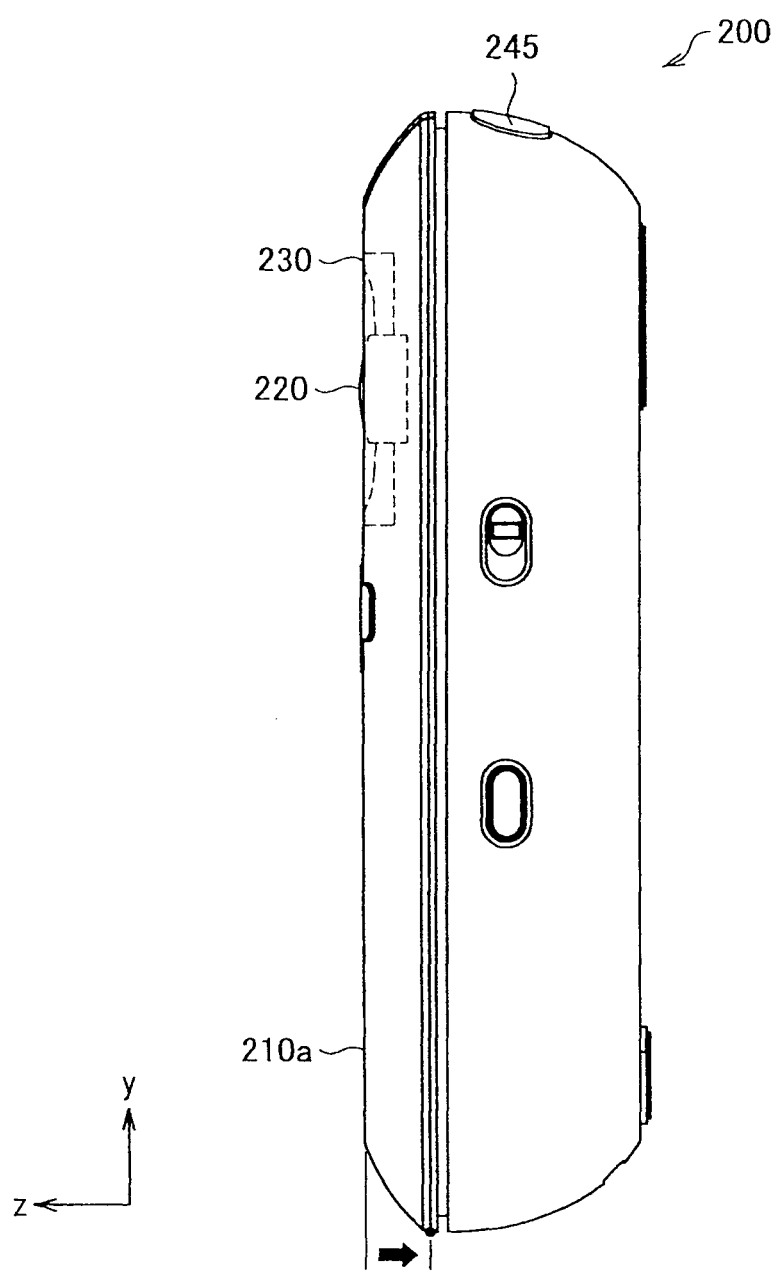
FIG. 3 is a side view showing the input device according to the embodiment.
Figure 4:
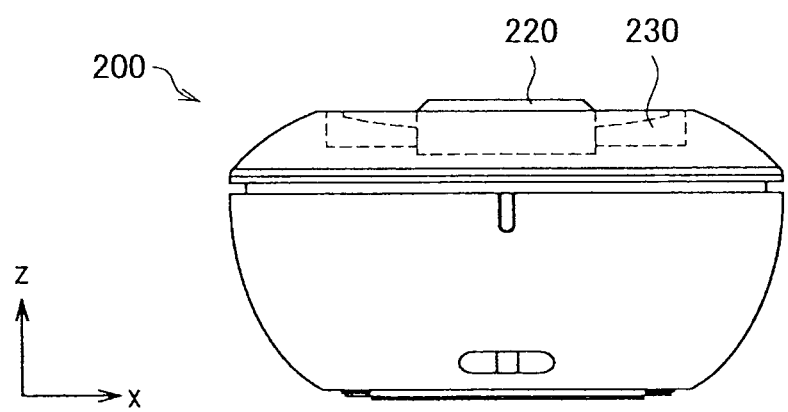
FIG. 4 is a plan view showing the input device according to the embodiment.

At first, the configuration and function of the input device 200 according to the embodiment will be described with reference to FIGS. 2 to 4. FIG. 2 is a top view showing the input device 200 according to the embodiment. FIG. 3 is a side view showing the input device 200 according to the embodiment. FIG. 4 is a plan view showing the input device 200 according to the embodiment. In the following, the explanation will be made assuming that the horizontal direction of the input device 200 is the x direction, the vertical direction (longitudinal direction) thereof is the y direction, and the height direction thereof is the z direction. The moving direction of the object in the display region 160 is defined so that the horizontal direction (lateral direction) is the x direction and the vertical direction (longitudinal direction) is the y direction.

The input device 200 according to the embodiment is an input device which functions as the mouse mode or air mode described above. The input device 200 includes a casing 210 having a substantially oblong shape as shown in FIG. 2 and a plurality of operation units provided at the top and side faces of the casing 210. The casing 210 is formed so that its top face and back face are substantially flat and its outer edge is rounded as shown in FIGS. 2 to 4. In the input device 200 according to the embodiment, the corners of the casing 210 are removed more at the back face (in the negative direction of the y axis) than at the region where the operation units for inputting the input information are provided, and thus the input device 200 can be easily held and erroneous operations can be reduced.

The operation unit is a member to be operated for inputting the input information, and includes a sensor unit 220, four-direction key 230 and buttons 241 to 246 (L, R), for example. The sensor unit 220 is a detection unit for detecting the moving amount of a finger to be moved on the surface of the sensor unit 220, and includes an optical pointing device 222 and an operation panel 224 having a substantially circular plane. The sensor unit 220 detects a fingerprint of a finger to be moved on the operation panel 224 via an optical sensing device (optical pointing device 222) arranged below a sensor window, and generates the input information for operating an object to be operated based on the moving amount of the fingerprint.

The four-direction key 230 is an annular button provided around the sensor unit 220. When pressed by a finger, the four-direction key 230 can move an object to be operated in the vertical direction (the y direction) and the horizontal direction (the x direction) according to the pressed position.

The buttons 241 to 246 (L, R) output the corresponding input information when pressed. For example, the buttons 241, 242, 243 and 244 can be associated with a processing of returning an operation, a keyboard display processing of displaying a software keyboard on the display unit, a decision processing of deciding an operation, and a menu display processing of displaying the menu screen, respectively. Further, the button 245 can be associated with a processing of switching the mouse mode and the air mode or a scroll processing capable of performing the scroll operation on the display contents. The buttons 246L and 246R can be associated with the left button and the right button of a typical mouse, respectively, when the input device 200 functions in the mouse mode.

In order to scroll the display contents displayed on the display unit by using the input device 200, for example, the button 245 associated with the scroll processing in the air mode is pressed to enable the scroll operation. Then, a finger is moved on the operation panel 224 of the sensor unit 220, thereby scrolling the display contents depending on the moving direction of the finger.

The direction in which the object on the display unit moves through the scroll operation based on the finger movement is decided based on the coordinate axes defined in the input device 200. In other words, when the movement in the vertical direction (for example, the y direction) defined in the input device 200 is detected, the display contents are scrolled in the vertical direction on the display unit. When the movement in the horizontal direction (for example, the x direction) defined in the input device 200 is detected, the display contents are scrolled in the horizontal direction on the display unit. Since the scroll direction is decided in this way, even when a finger is moved on the operation panel 224 in the vertical direction for scrolling the display contents on the display unit in the vertical direction, for example, the display contents may not be scrolled in the vertical direction unless the finger moving direction coincides with the vertical direction of the input device 200. Thus, a finger needs to be moved in accordance with the direction of the input device 200 corresponding to the direction in which the display contents are to be scrolled.

In particular, the input device 200 according to the embodiment is operated by only the thumb in the air mode as shown in FIG. 1. The thumb moves in the vertical direction according to its movement of expanding and contracting between its tip and its root and moves in the horizontal direction according to its movement of moving substantially parallel around the root of the thumb. Thus, the thumb can substantially linearly move in the horizontal direction but is difficult to linearly move in the vertical direction. Therefore, when the thumb is moved to perform the scroll operation, the scroll operation in the vertical direction may be erroneously recognized as the scroll operation in the horizontal direction.

In the input device 200 according to the embodiment, the operation panel 224 of the sensor unit 220 is formed to be curved viewed from the section (the yz plane) parallel to the vertical direction (the y direction) of the input device 200 and to be flat and linear viewed from the section (the zx plane) parallel to the horizontal direction (the x direction). Thus, the finger moving direction and the direction of the input device 200 can be easily coincided with each other. In other words, as shown in FIG. 3, the center of the operation panel 224 of the sensor unit 220, in which the optical pointing device 222 is provided, is projected most and has a convex curve in the yz plane. On the other hand, as shown in FIG. 4, the operation panel 224 of the sensor unit 220 is flat in which the corners at both ends of the panel are removed in the zx plane. In this manner, the operation panel 224 of the sensor unit 220 is formed like a curved face of a member whose cylinder is cut in the height direction.

With the shape of the operation panel 224, when being moved in the vertical direction, the thumb is moved along the curved face of the operation panel 224 to facilitate the linear movement. The direction of the curved face is coincided with the vertical direction of the input device 200 at this time, so that the user can move his/her thumb in the direction defined in the input device 200 by moving the thumb along the shape of the operation panel 224 without being aware of the direction defined in the input device 200. Thus, the display contents displayed on the display unit can be accurately moved, thereby reducing erroneous operations which result in erroneous recognition of the scroll direction.

On the other hand, as described above, the thumb can substantially linearly move relative to the horizontal direction. Therefore, the moving direction is difficult to offset even when the operation panel 224 is flat, and less needs to have a curved shape like the vertical direction. Further, with only the vertical direction curved, it is possible to recognize in which direction of the directions defined in the input device 200 the finger moves from the shape of the operation panel 224 to be sensed by the finger. The user can move his/her finger while recognizing the linger moving direction, thereby reducing erroneous operations which result in erroneous recognition of the scroll direction.

In order for the user to easily recognize the correspondence between the finger moving direction and any of the directions defined in the input device 200, for example, the groove on the operation panel 224 extending in the horizontal direction (the x direction) of the input device 200 may be formed in the vertical direction (the y direction) in plural. With such a shape, the user recognizes the unevenness of the surface only when moving his/her finger in the vertical direction. Alternatively, the groove on the operation panel 224 extending in the vertical direction (the y direction) of the input device 200 may be formed in the horizontal direction (the x direction) in plural to cause the user to recognize the unevenness of the surface only when the user moves his/her finger in the horizontal direction. Thus, the user can easily recognize the finger moving direction relative to the input device 200, thereby accurately performing the scroll operation on the display contents displayed on the display unit.

Further, the operation panel 224 of the sensor unit 220 is provided with slight unevenness to be rough texture, thereby reducing a friction more as compared with a smooth surface without any unevenness. Thus, the slidability of the finger on the operation panel 224 is improved, thereby enhancing the operability. In particular, the finger can be smoothly moved, thereby reducing its fatigue due to its movement.

The input device 200 according to the embodiment is operated by the thumb of a hand holding the casing 210 in the air mode. Thus, the shape of the casing 210 is decided so as to avoid a bulge of the palm closer to the wrist side than to the root of the thumb. Therefore, the thumb can be smoothly moved and a fluctuation of the input device 200 due to a finger movement during the operation can be reduced.

At first, the casing 210 is formed such that its rear end (in the negative direction of the y axis) is positioned at the inner side. The input device 200 shown in FIG. 2 is formed so that the rear end of the casing 210 is semicircular. With the rear end of the casing 210 having substantially right-angled corners as shown in a dashed line, a bulge between the root of the thumb and the wrist contacts the rear end of the input device 200 when the input device 200 is held by a hand, and the thumb is difficult to move. In this way, the casing 210 is formed so that its rear end is positioned at the inner side of the input device 200 in order to remove the sites hindering the operation, thereby improving the operability of the input device 200.

When the thumb moves in the vertical direction, the bulge between the root of the thumb and the wrist also moves in the vertical direction. At this time, the rear end of the casing 210 easily contacts the bulge so that the tip of the casing 210 easily rises in the height direction (the z direction). Then, the hold state of the input device 200 changes and thus its operability decreases. In order to avoid the issue, the rear end of the casing 210 in the input device 200 according to the embodiment is formed to be lower in its height than the operation panel 224 of the sensor unit 220. For example, as shown in FIG. 3, the height of the upper face 210a having substantially the same height as the operation panel 224 is formed to be lower toward the read side (in the negative direction of the y axis) at the rear end of the casing 210. In FIG. 3, the corners of the casing 210 are rounded such that the upper face 210a is curved in the negative direction of the z axis toward the rear end of the casing 210.

Figure 5A:
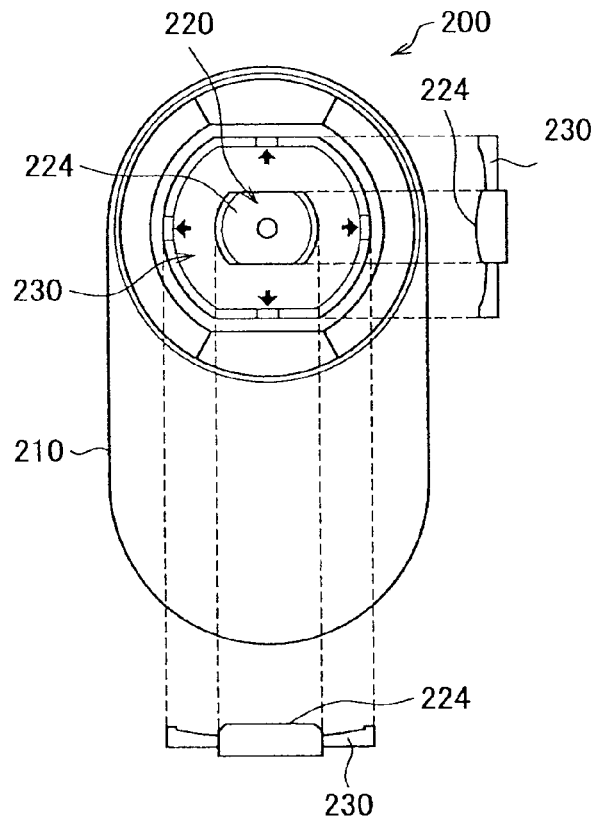
FIG. 5A is a top view showing another form of the input device.
Figure 5B:
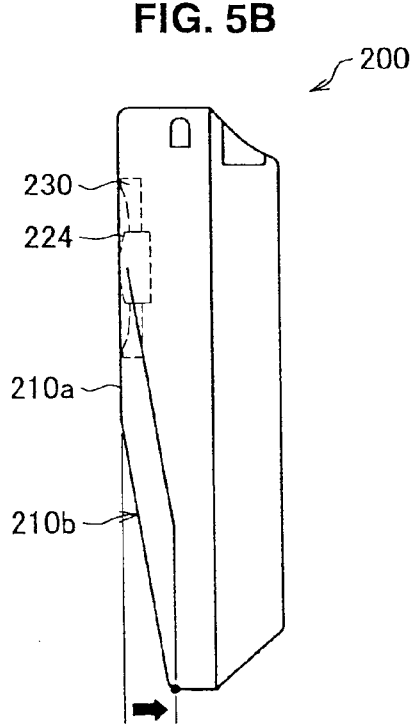
FIG. 5B is a side view of the input device shown in FIG. 5A.

The shape of the input device 200 according to the embodiment is not limited to those shown in FIGS. 2 to 4 and may have other shape. For example, as shown in FIGS. 5A and 5B, a plurality of buttons may be arranged around the four-direction key 230 in an annular manner. The operation panel 224 of the sensor unit 220 in FIG. 5A is oblong but is set to be curved viewed from the section (the yz plane) parallel to the vertical direction of the input device 200 and to be flat and linear viewed from the section (the zx plane) parallel to the horizontal direction. As shown in FIG. 5B, at the rear end of the casing 210, the upper face 210a is formed with a plane 210b inclined in the negative direction of the z axis toward the rear end of the casing 210, thereby removing the corners of the casing 210 which easily contact the bulge at the root of the thumb during the operation. The input device 200 excellent in its operability is realized with the above shape.

Figure 6:
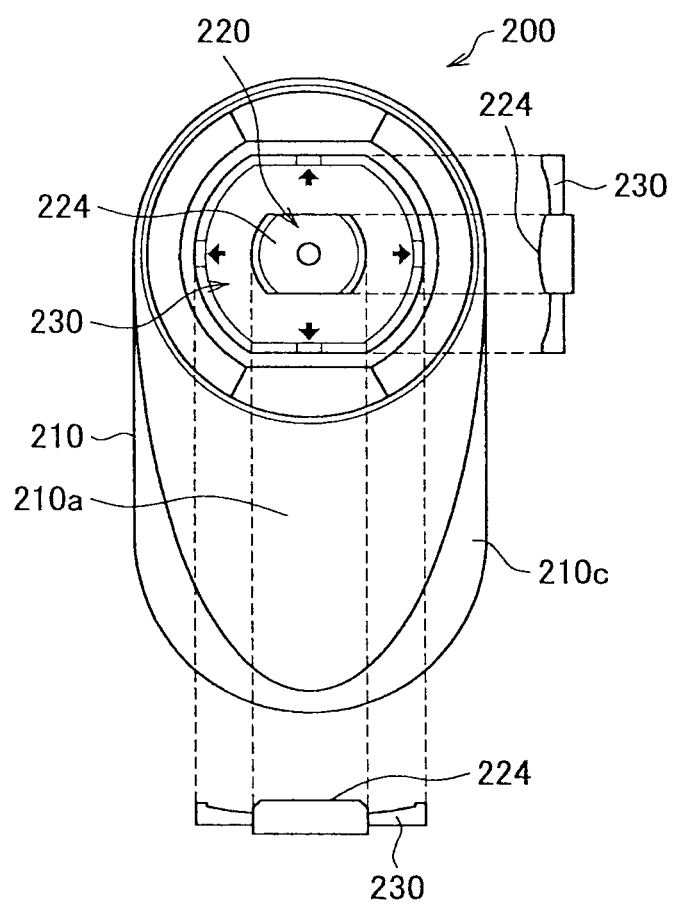
FIG. 6 is a top view showing another form of the input device.
Figure 7:
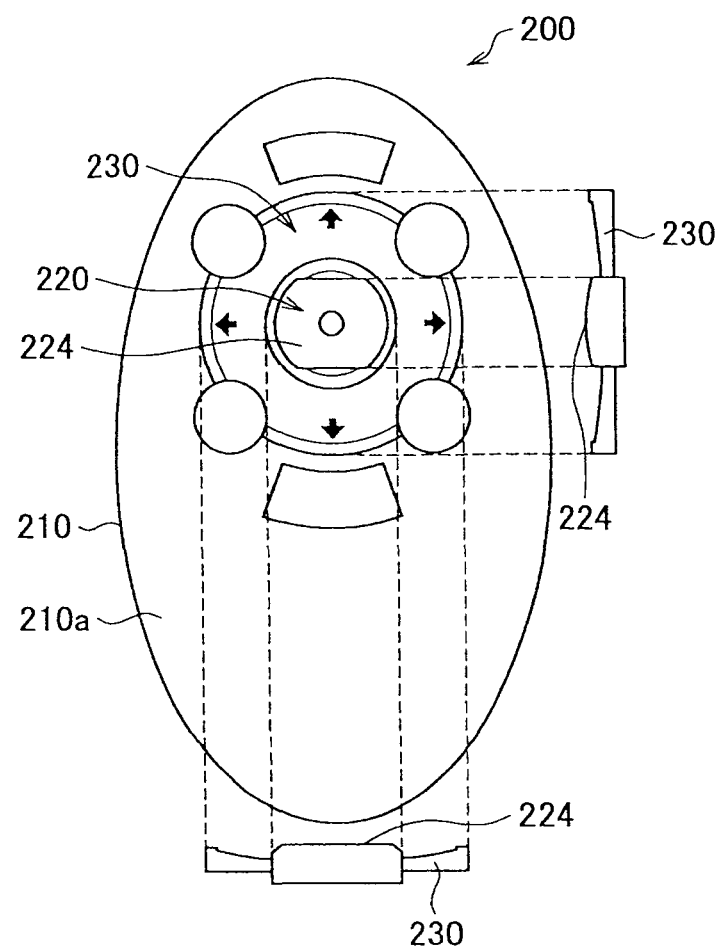
FIG. 7 is a top view showing still another form of the input device.

Other shape of the input device 200 may include a shape in which the height of the upper face 210a at the rear end of the casing 210 is lowered from the center of the casing 210 toward the outer edge as shown in FIG. 6. Alternatively, as shown in FIG. 7, the casing 210 may be formed so that the upper face 210a has an egg-shaped curved face. With any shape, the operation panel 224 of the sensor unit 220 is formed to be curbed viewed from the section (the yz plane) parallel to the vertical direction of the input device 200 and to be flat and linear viewed from the section (zx plane) parallel to the horizontal direction. Further, at the rear end of the input device 200, the corners of the casing 210 which easily contact the bulge at the root of the thumb during the operation are removed so that the bulge between the root of the thumb and the wrist is prevented. Thus, the input device 200 excellent in its operability is realized.

The shapes of the input device 200 as shown in FIGS. 2 to 7 have the advantages of enhancing the operability and additionally reducing user's fatigue due to the operation of the input device 200. The configuration and function of the input device 200 according to the embodiment have been described above.

[Hardware Configuration]

Figure 8:
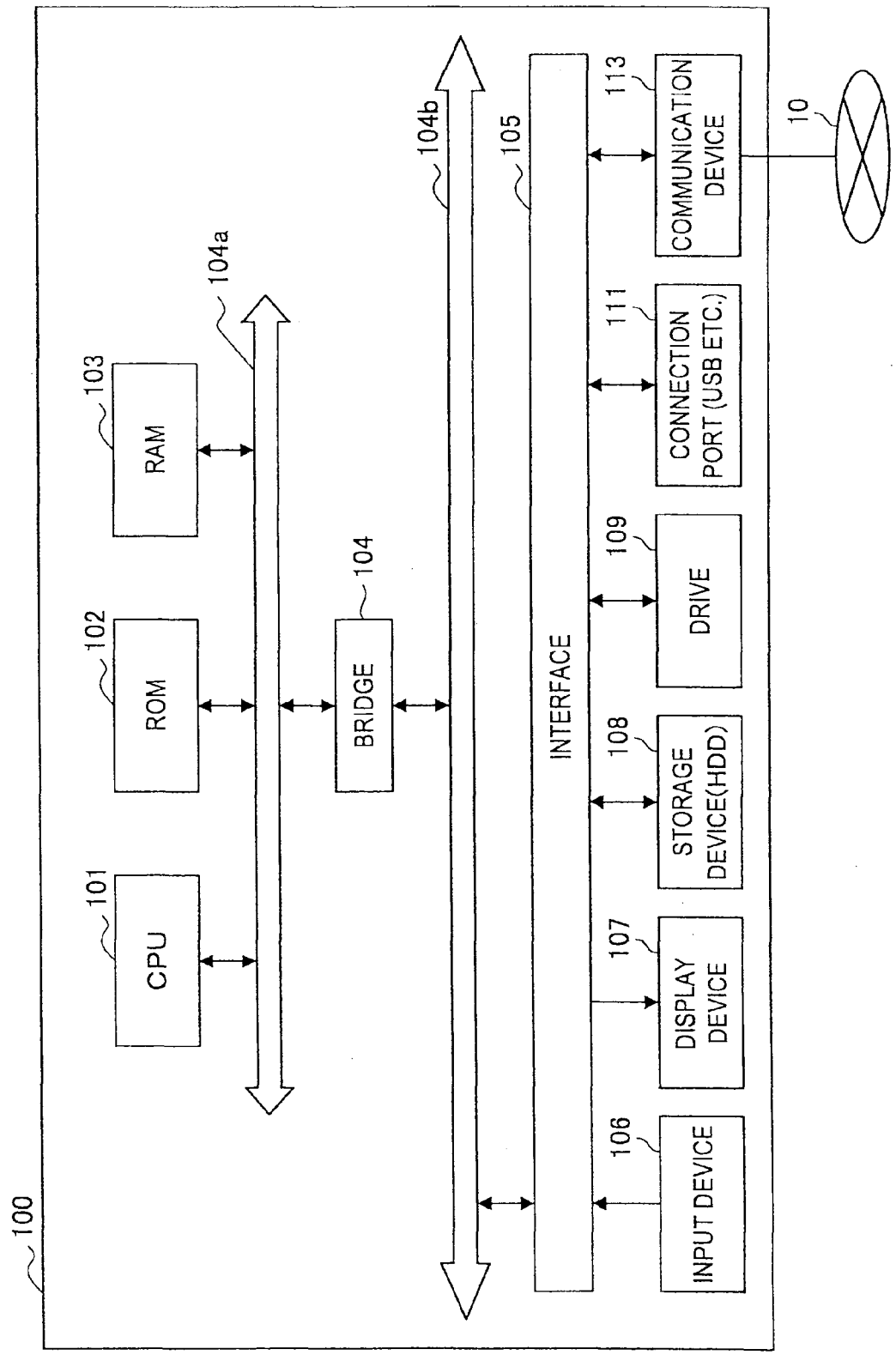
FIG. 8 is a block diagram showing one example of a hardware configuration of a control device constituting the input unit according to the embodiment.
Figure 9:
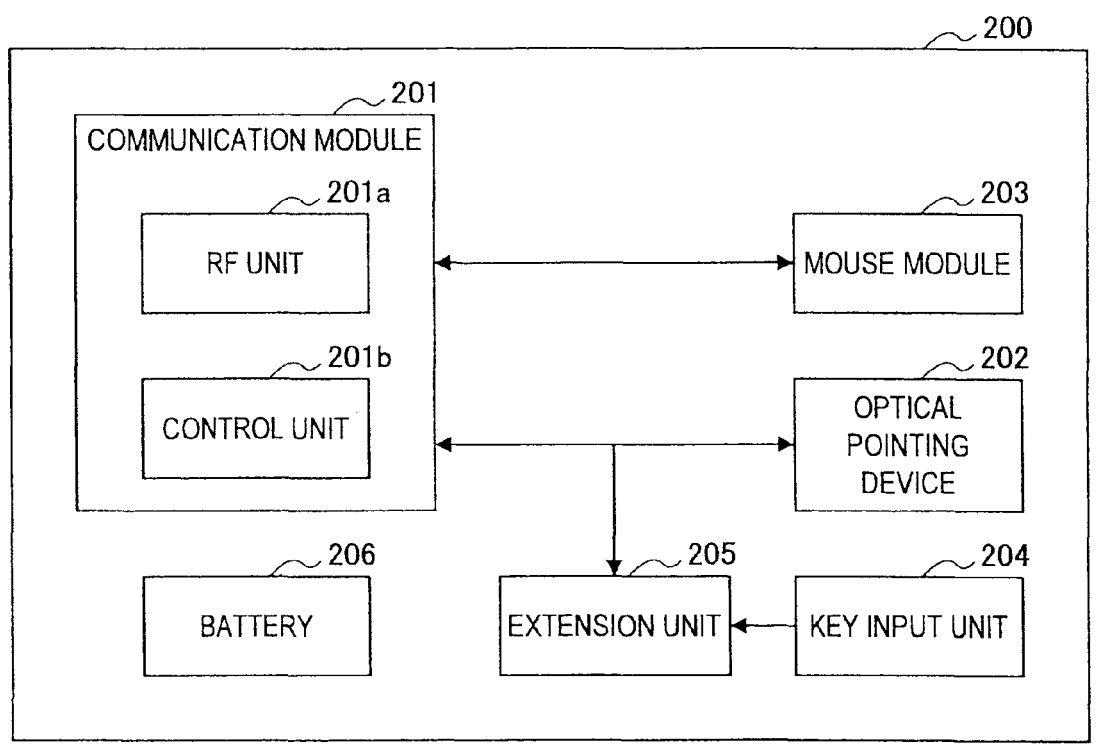
FIG. 9 is a block diagram showing one example of a hardware configuration of the input device constituting the input unit according to the embodiment.

Next, a hardware configuration of the input unit according to the embodiment will be described with reference to FIGS. 8 and 9. FIG. 8 is a block diagram showing one example of the hardware configuration of the control device 100 constituting the input unit according to the embodiment. FIG. 9 is a block diagram showing one example of the hardware configuration of the input device 200 constituting the input unit according to the embodiment.

(Hardware Configuration Example of Control Device)

The control device 100 constituting the input unit according to the embodiment can be realized with a processing device such as personal computer as described above. The control device 100 includes a CPU (Central Processing Unit) 101, a ROM (Read Only Memory) 102, a RAM (Random Access Memory) 103 and a host bus 104a as shown in FIG. 8. The control device 100 includes a bridge 104, an external bus 104b, an interface 105, an input device 106, an output device 107, a storage device (HDD) 108, a drive 109, a connection port 111 and a communication device 113.

The CPU 101 functions as a computing processor and a control device and controls the entire operations of the control device 100 according to various programs. The CPU 101 may be a microprocessor. The ROM 102 stores therein programs or calculation parameters to be used by the CPU 101. The RAM 103 temporarily stores therein programs to be used by the CPU 101 for its execution or parameters to be appropriately changed in their executions. These components are connected with each other via the host bus 104a configured of a CPU bus and the like.

The host bus 104a is connected to the external bus 104b such as PCI (Peripheral Component Interconnect/Interface) bus via the bridge 104. The host bus 104a, the bridge 104 and the external bus 104b may not be necessarily separated and may be mounted into one bus.

The input device 106 includes an input means, by which the user inputs information, such as mouse, keyboard, touch panel, buttons, microphone, switch and lever, and an input control circuit for generating and outputting an input signal based on the user's input to the CPU 101. The user of the control device 100 operates the input device 106, thereby inputting various items of data and instructing processing operations to the control device 100.

The output device 107 includes a display device such as CRT (Cathode Ray Tube) display device, liquid crystal display (LCD) device, OLED (Organic Light Emitting Diode) device and lamp. Further, the output device 107 includes an audio output device such as speaker and headphone. In the present embodiment, as shown in FIG. 3, a display unit 140 described later is provided as the output device 107.

The storage device 108 is a data storage device constituted as one example of a storage unit of the control device 100. The storage device 108 may include a storage medium, a recording device for recording data in the storage medium, a readout device for reading out the data from the storage medium and a deletion device for deleting the data recorded in the storage medium. The storage device 108 is constituted with a HDD (Hard Disk Drive), for example. The storage device 108 drives the hard disk and stores therein the programs to be executed by the CPU 101 or various items of data.

The drive 109 is a reader/writer for storage medium and is incorporated in or externally attached to the control device 100. The drive 109 reads information recorded in a removable recording medium such as mounted magnetic disk, optical disk, magnetooptical disk or semiconductor memory, and outputs the same to the RAM 103.

The connection port 111 is an interface to be connected to an external device, and is a connection port to a data transmittable external device via a USB (Universal Serial Bus), for example. The communication device 113 is a communication interface constituted with a communication device for connecting to a communication network 15, for example. The communication device 113 may be a communication device for wireless LAN (Local Area Network), a communication device for wireless USB, or a wired communication device for making wired communication.

(Hardware Configuration Example of Input Device)

The input device 200 constituting the input unit according to the embodiment includes a communication module 201, an optical pointing device 202 and a mouse module 203 as shown in FIG. 9. The input device 200 further includes a key input unit 204, an extension unit 205 and a battery 206.

The communication module 201 is a communication device for exchanging the information with the control device 100. The communication module 201 includes a RF unit 201a for making high-frequency wireless communication such as Bluetooth (registered trademark) and a control unit 201b for performing communication control. The optical pointing device 202, the mouse module 203 and the key input unit 204 are input means for inputting the information to be sent by the communication module 201.

The optical pointing device 202 is a device for detecting a finger movement and corresponds to the optical pointing device 222 of the above sensor unit 220. The optical pointing device 202 includes a control circuit for acquiring an image to be detected (for example, of a finger) and performing an image processing on the acquired image and an interface processing with the communication module 201, and a light emitting unit such as LED. The mouse module 203 is a module for realizing the input function of a typical optical mouse, and includes a light emitting unit such as LED or laser light source for outputting a light, a light receiving unit for detecting a reflected light of the light output from the light emitting unit, and a computing processor for calculating the moving amount of the input device 200. The key input unit 204 is an input means such as button, switch and lever.

The input device 200 is operated so that the information input from the optical pointing device 202, the mouse module 203 and the key input unit 204 is converted into an input signal via the input control circuit or the like to be output to the communication module 201. The extension unit 205 may be provided between the key input unit 204 and the communication module 201. The battery 206 is provided for causing the input device 200 to function in a wireless manner.

[Functional Configuration of Input Unit]

Figure 10:
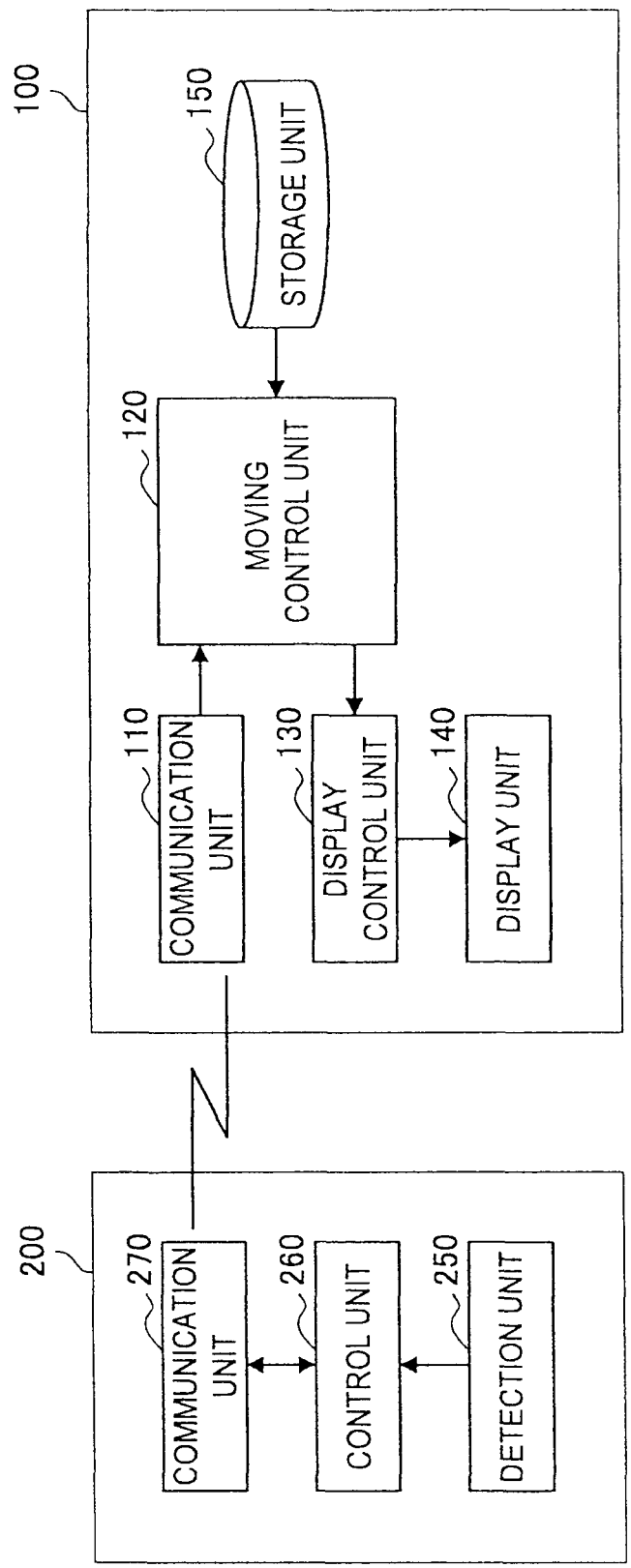
FIG. 10 is a functional block diagram showing a functional configuration of the input unit according to the embodiment.

A functional configuration of the input unit according to the embodiment will be described below with reference to FIG. 10. FIG. 10 is a functional block diagram showing a functional configuration of the input unit according to the embodiment. FIG. 10 shows only a function unit which functions for performing the operation control processing according to the embodiment, and the control device 100 and the input unit 200 may further include the function units for performing other processings.

The input unit according to the embodiment includes the control device 100 and the input device 200 as described above. In terms of the functionality of the input unit, the control device 100 includes a communication unit 110, a moving control unit 120, a display control unit 130, a display unit 140 and a storage unit 150. The input device 200 includes a detection unit 250, a control unit 260 and a communication unit 270.

The communication unit 110 of the control device 100 is a function unit for exchanging the information with the input device 200 and corresponds to the communication device 113 of FIG. 8. The communication unit 110 receives the input information received from the input device 200 and outputs the same to the moving control unit 120.

The moving control unit 120 moves an object to be operated, which is displayed on the display unit 140, based on the input information. When receiving the input information from the communication unit 110, the moving control unit 120 calculates the moving direction and the moving amount of the object displayed on the display unit 140 based on the moving direction and the moving amount of a finger included in the input information. At this time, the moving control unit 120 refers to the correction information stored in the storage unit 150 to change the moving amount of the object depending on the finger moving direction. The moving control unit 120 outputs the calculated object moving direction and moving amount to the display control unit 130. The moving control unit 120 decides the moving direction of a second object which moves in a predetermined direction depending on the object movement, and outputs the moving direction and moving amount of the second object to the display control unit 130 based on the moving direction and moving amount of the object.

The display control unit 130 changes the display information displayed on the display unit 140 depending on the moving direction and moving amount of the object or second object input from the control unit 120, and processes the same into a displayable form on the display unit 140. The display control unit 130 outputs the display information subjected to the display processing to the display unit 140 and displays the same on the display unit 140. The display unit 140 is a function unit for displaying the display information and corresponds to the display device 107 in FIG. 8. The moving control unit 120 and the display control unit 130 can realize their functions by the CPU 101 of FIG. 8.

The storage unit 150 is a nonvolatile memory such as the ROM 102 or flash memory for storing therein various items of information necessary for performing the object moving control. The storage unit 150 stores therein the correction information for correcting the object moving amount based on the finger moving direction and moving amount input from the input device 200, for example. The correction information is directed for enabling the user to smoothly move the object displayed on the display unit 140 in consideration of the operational characteristics of the thumb when the user moves his/her thumb on the operation panel 224 of the sensor unit 220 in the input device 200 to input the input information as described above. The correction information and the operation controlling method using the correction information will be described below in detail.

The storage unit 150 stores therein recognition information to be used for deciding the moving direction of the second object. The recognition information is indicative of the correspondence relationship between the moving direction as well as moving amount of the object and the moving direction of the second object. The recognition information and the method for deciding the moving direction of the second object will be described below in detail.

On the other hand, the detection unit 250 of the input device 200 is a function unit for detecting a position of a finger to be detected. The detection unit 250 acquires a finger's image in a predetermined region, for example, thereby to detect an arbitrary point (such as fingerprint) of the finger within the region. The detection unit 250 outputs the acquired finger's positional information to the control unit 260.

The control unit 260 calculates the moving direction and moving amount of the finger based on the positional information input from the detection unit 250. The control unit 260 calculates the moving direction and moving amount of the finger based on the change in the position of the arbitrary point of the finger over time, and further calculates the speed and the acceleration based on the information. The control unit 260 outputs the calculated information as the input information to the communication unit 270. The detection unit 250 and the control unit 260 correspond to the optical pointing device 202 of FIG. 9.

The communication unit 270 is a function unit for exchanging the information with the control device 100 and corresponds to the communication module 201 of FIG. 9. When the input information is input from the control unit 260, the communication unit 270 transmits the input information to the control device 100.

The configurations of the control device 100 and the input device 200 in the input unit according to the embodiment have been described above. When the input device 200 is operated to move the object displayed on the display unit 140, the input unit is controlled in its operation by the moving control unit 120 for facilitating the object's operation. The operation control by the moving control unit 120 of the input unit according to the embodiment will be described below.

<3. Operation Controlling Method by Operation Control Unit>

[Correction of Object Moving Amount]

Figure 11:
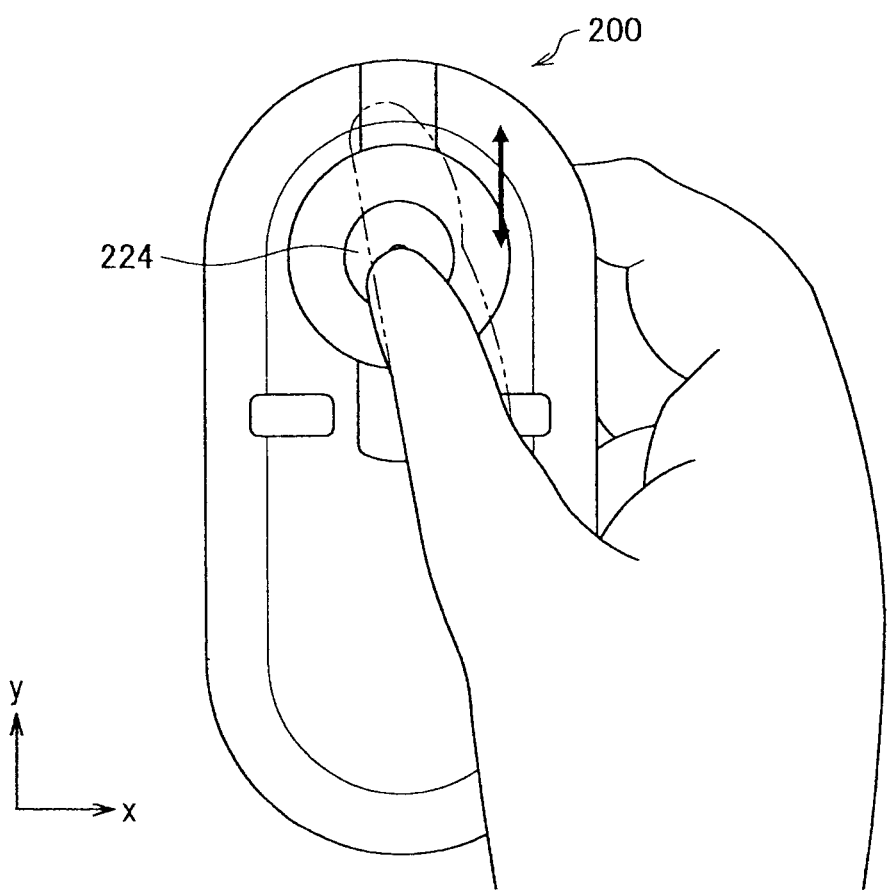
FIG. 11 is an explanatory diagram showing the vertical movement of the thumb operating the input device according to the embodiment.
Figure 12:
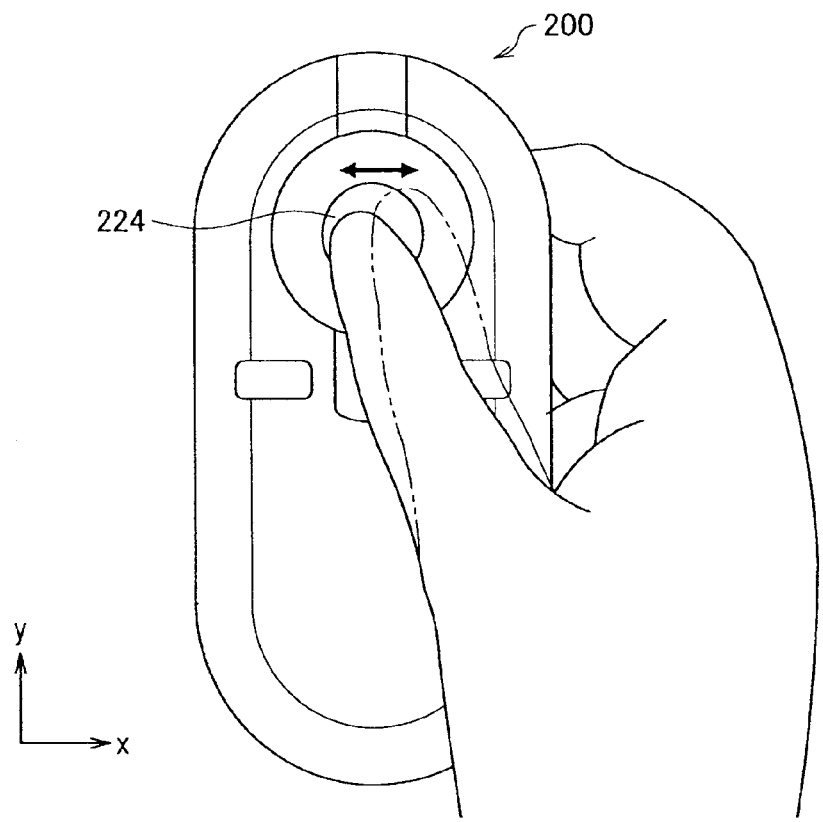
FIG. 12 is an explanatory diagram showing the horizontal movement of the thumb operating the input device according to the embodiment.

The operation control unit 120 according to the embodiment can correct the object moving amount based on the input information. For example, it is assumed that the thumb is moved on the operation panel 224 of the sensor unit 220 in the input device 200 according to the embodiment to input the input information and to scroll the display contents displayed on the display unit 140. When the display contents on the display unit 140 are scrolled in the vertical direction, as shown in FIG. 11, the thumb is moved in the vertical direction on the operation panel 224 of the input device 200. On the other hand, when the display contents on the display unit 140 are scrolled in the horizontal direction, as shown in FIG. 12, the thumb is moved in the horizontal direction on the operation panel 224 of the input device 200.

Figure 13:
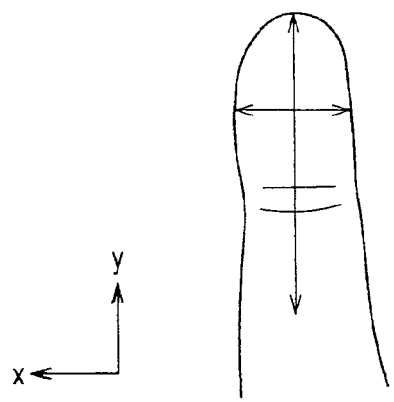
FIG. 13 is an explanatory diagram showing a movable range of the thumb.

In light of the movement of the thumb on the operation panel 224 for inputting the input information, as shown in FIG. 11, the thumb can be largely moved in the vertical direction (the y direction). To the contrary, as shown in FIG. 12, the thumb may not be largely moved in the horizontal direction (the x direction) unlike in the vertical direction. The difference is due to the shape of the finger. FIG. 13 shows a thumb viewed from its side. The thumb is longer in the longitudinal direction from its tip toward its root than in the width direction of the finger.

The sensor unit 220 in the input device 200 according to the embodiment detects the position of a finger moving on the optical pointing device 222 thereby to detect the moving direction and moving amount of the finger. Thus, if a finger is not present on the optical pointing device 222, the moving amount of the finger may not be detected. Therefore, if the display contents on the display unit 140 are scrolled by the finger moving amount detected by the sensor unit 220, the thumb can be largely moved in the vertical direction, so that the scroll amount through one operation of moving a finger from top down, for example, is large. However, when the finger is moved in its width direction or from left to right, the finger easily offsets out of the region detectable by the optical pointing device 222 and the amount by which the display contents on the display unit 140 can be scrolled through one operation is much smaller than in the vertical direction. Thus, the finger had to be moved many times in order to largely scroll the display contents in the horizontal direction.

Figure 15A:
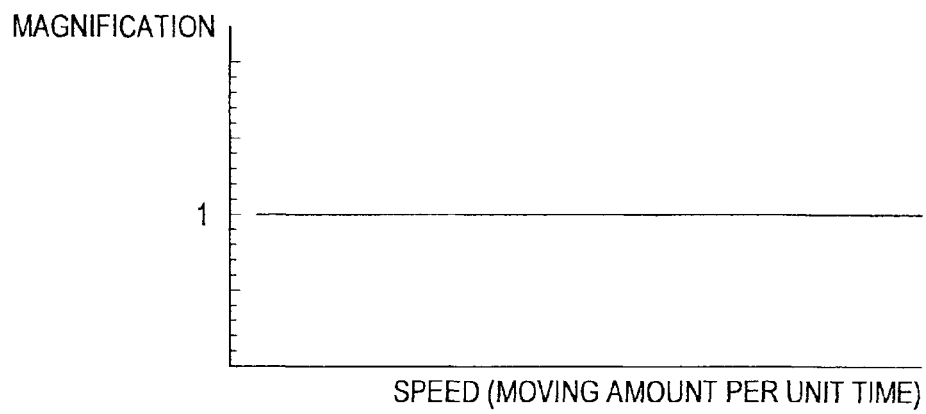
FIG. 15A is a graph showing a magnification of the object moving amount relative to a finger moving speed, which shows a case where the magnification of the object moving amount is constant.

The moving control unit 120 in the input unit according to the embodiment corrects the object moving amount based on the input information in order to solve the above issue. The object moving amount correction processing will be described below with reference to FIGS. 14 to 16. FIG. 14 is an explanatory diagram for describing the correction of the object moving amount based on a ratio of the display region. FIGS. 15A to 15F are graphs showing the magnification of the object moving amount relative to the finger moving speed. FIG. 16 is an explanatory diagram for describing the correction of the object's inertial moving amount based on a finger movement (moving direction and speed).

(1. Correction of Moving Amount Based on Ratio of Display Region)

There will be first described a processing of correcting the object moving amount based on a ratio of the display region by the input unit according to the embodiment with reference to FIG. 14. The object moving amount correction processing uses a ratio determined based on the display region such as aspect ratio of the display region on which an object is displayed, thereby correcting the object moving amount. In the following, as shown in FIG. 14, there will be considered a case in which the pointer 162 to be operated (object) is displayed within the display region 160 on the display unit 140. The user moves his/her thumb on the sensor unit 220 in the input device 200 thereby to move the pointer 162 within the display region 160.

As one example of the object moving amount correction processing based on the ratio of the display region, the input unit uses the correction information determined based on the aspect ratio of the display region 160 within which the pointer 162 moves, thereby correcting the moving amount of the pointer 162. For example, within the horizontally-long display region 160 as shown in FIG. 14, the movable distance of the pointer 162 is larger in the lateral direction (the x direction) than in the longitudinal direction (the y direction). Thus, the moving amount of the pointer 162 within the display region 160 is made larger in the lateral direction than in the longitudinal direction when the thumb is moved by the unit moving amount in the vertical direction and in the horizontal direction. Thus, the pointer 162 can be easily moved in the lateral direction in which the movable distance is longer.

The weighting (correction information) relative to the moving amount of the pointer 162 at this time is a:b based on the aspect ratio of the display region 160. In other words, if the pointer 162 moves by the moving amount v in the longitudinal direction when the thumb is moved by the moving amount u, the pointer moves by (b/a)×v in the lateral direction. In this way, the moving amount of the pointer 162 is made larger in the horizontal direction in which the movable distance is longer than in the longitudinal direction, so that the pointer 162 can be largely moved in the lateral direction by a small finger moving amount.

The correction information is generated based on the aspect ratio of the display region 160 in the above method, but preset correction information may be used, for example, to correct the moving amount based on the movable distance which is set for the movable direction of the pointer 162 within the display region 160. Specifically, at first, the movable distances in the longitudinal direction (the y direction) and in the lateral direction (the x direction), which are the movable directions of the pointer 162 within the display region 160 shown in FIG. 14, are compared with each other. In FIG. 14, since the movable distance in the lateral direction is larger, the moving amount of the pointer 162 in the lateral direction is made larger by predetermined magnification than in the longitudinal direction. The predetermined magnification is preferably about twice such that a feeling of strangeness will not occur during the operation due to the difference in the moving amounts of the pointer 162 between in the longitudinal direction and in the lateral direction when the finger is moved by the unit moving amount.

(2. Correction of Moving Amount Based on Finger Moving Speed)

Next, the object moving amount correction processing based on the finger moving speed by the input unit according to the embodiment will be described with reference to FIGS. 15A to 15F. The object moving amount correction processing changes the moving amount of the pointer 162 within the display region 160 for the unit moving amount for each finger moving direction depending on the linger moving speed.

As shown in FIGS. 11 and 12, the moving amount by which the thumb is movable through one operation is different for each moving direction. Therefore, when the moving speed is set to be constant, the detection time capable of detecting the thumb moving in the horizontal direction (the x direction) by the optical pointing device 222 of the sensor unit 220 is shorter than the thumb moving in the vertical direction (the y direction) is detected. As faster the finger moving speed is, the shorter the detection time in the horizontal direction is and consequently, the smaller the moving amount of the pointer 162 is. In this way, the number of times of moving the finger needs to be increased in order to rapidly move the thumb in the horizontal direction and to move the pointer 162 by predetermined distance.

In the moving amount correction processing, the moving amount of the pointer 162 within the display region 160 is changed for the unit moving amount for each finger moving direction depending on the finger moving speed. For example, when the finger is moved in the two directions or in the vertical direction and in the horizontal direction, for the moving amount of the pointer 162 per finger's unit moving amount, the moving amount in the horizontal direction in which the detection time is shorter is changed relative to the vertical direction in which the detection time is longer.

The correction information may use speed magnification distribution information shown in FIGS. 15B to 15F, for example. FIG. 15A shows the speed magnification distribution information when the ratio of the moving amounts of the pointer 162 in the vertical direction and in the horizontal direction is not changed even if the thumb moving speed is changed. On the contrary, in the correction amount control processing, as shown in FIGS. 15B to 15F, the ratio of the moving amounts of the pointer 162 in the vertical direction and in the horizontal direction is changed when the thumb moving speed is changed. In FIGS. 15B to 15F, the magnification in the longitudinal axis represents the ratio of the longitudinal moving amount by which the pointer 162 moves in the vertical direction relative to the finger's unit moving amount to the lateral moving amount by which the pointer 162 moves in the horizontal direction (longitudinal moving amount/lateral moving amount).

Figure 15B:
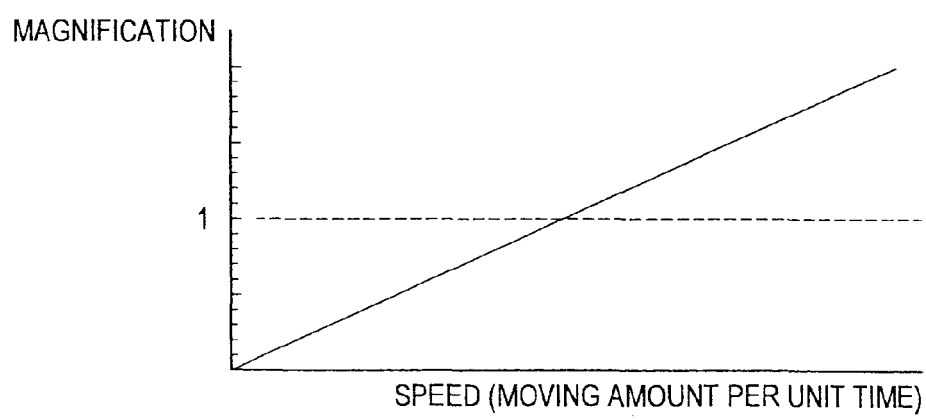
FIG. 15B is a graph showing a magnification of the object moving amount relative to the finger moving speed, which shows a case where the magnification of the object moving amount linearly changes depending on the finger moving speed.
Figure 16:
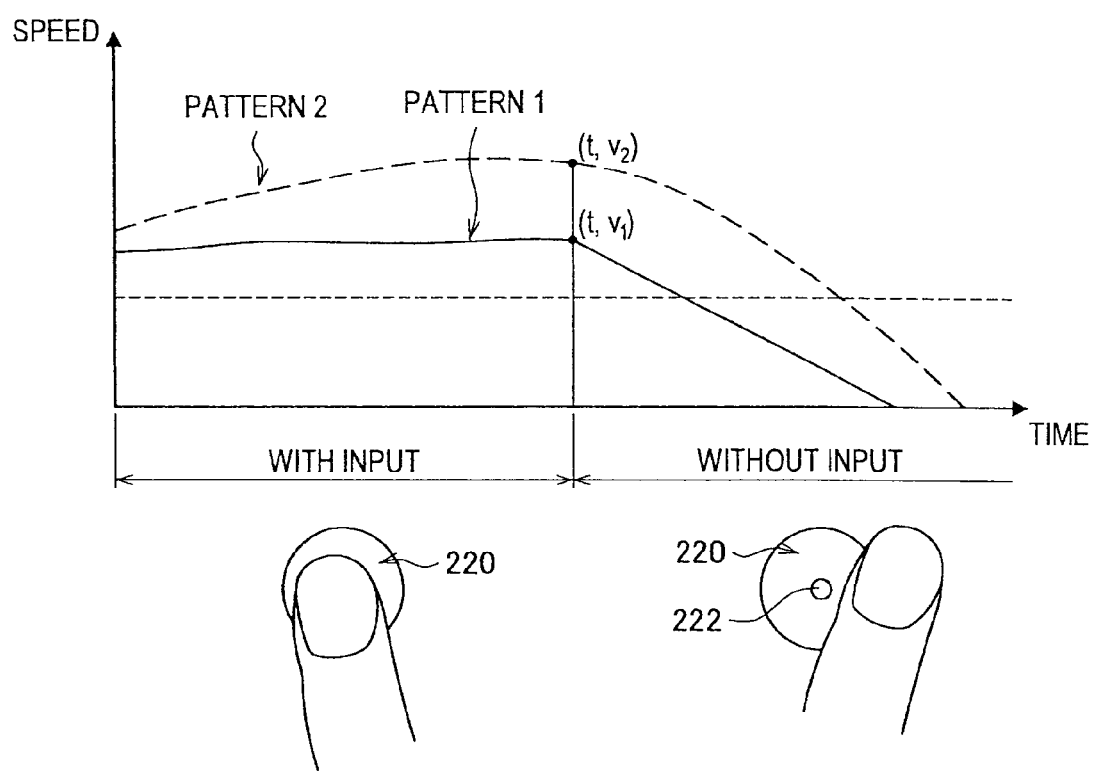
FIG. 16 is an explanatory diagram for describing correction of the object's inertial moving amount based on a finger movement (moving direction and speed)

For example, as shown in FIG. 15B, as the thumb moving speed increases, the ratio of the longitudinal moving amount to the lateral moving amount (that is, the magnification of the lateral moving amount relative to the longitudinal moving amount) may be linearly increased. With the speed magnification distribution information shown in FIG. 15B, as the thumb moving speed decreases, the ratio of the longitudinal moving amount to the lateral moving amount also decreases, and as the thumb moving speed increases, the ration of the longitudinal moving amount to the lateral moving amount also increases.

Figure 15C:
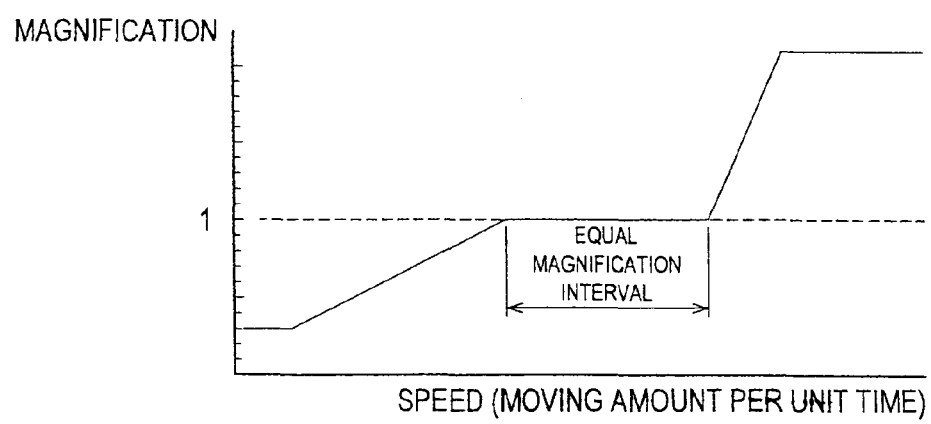
FIG. 15C is a graph showing a magnification of the object moving amount relative to the finger moving speed, which shows a case where the magnification of the object moving amount gradually changes depending on the finger moving speed.

Alternatively, as shown in FIG. 15C, as the thumb moving speed increases, the ratio of the longitudinal moving amount to the lateral moving amount may be gradually increased. In this case, in a certain moving speed interval (equal magnification interval), even when the thumb moving speed changes, the ratio of the longitudinal moving amount to the lateral moving amount for finger's unit moving amount does not change. However, if the finger moving speed decreases beyond the equal magnification interval, the ratio of the longitudinal moving amount to the lateral moving amount linearly decreases, and if the finger moving speed increases beyond the equal magnification interval, the ratio of the longitudinal moving amount to the lateral moving amount linearly increases. At this time, when the finger moving speed decreases and the magnification reaches the lower limit magnification or when the finger moving speed increases and the magnification reaches the upper limit magnification, the magnification may be set so as not to exceed the lower limit magnification or upper limit magnification even when the speed further decreases or increases.

Figure 15D:
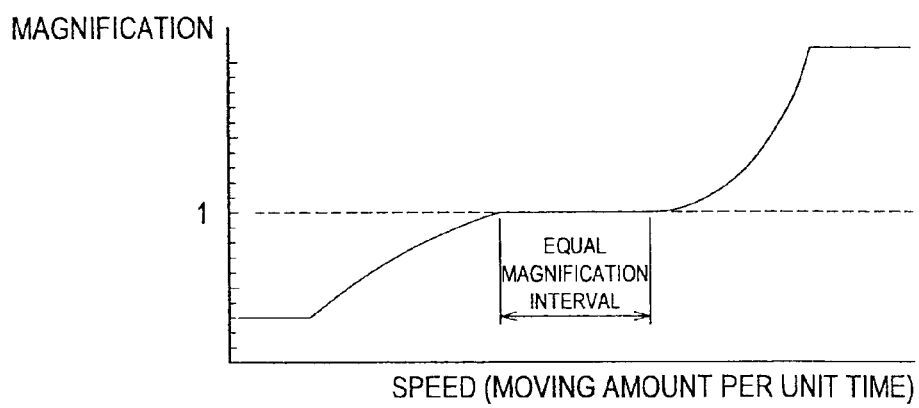
FIG. 15D is a graph showing a magnification of the object moving amount relative to the finger moving speed, which shows another example where the magnification of the object moving amount changes depending on the finger moving speed.
Figure 15E:
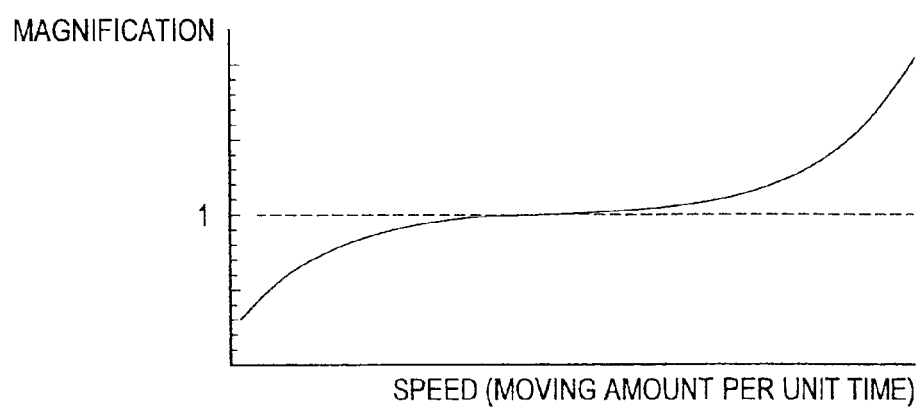
FIG. 15E is a graph showing a magnification of the object moving amount relative to the finger moving speed, which shows another example where the magnification of the object moving amount changes depending on the finger moving speed.
Figure 15F:
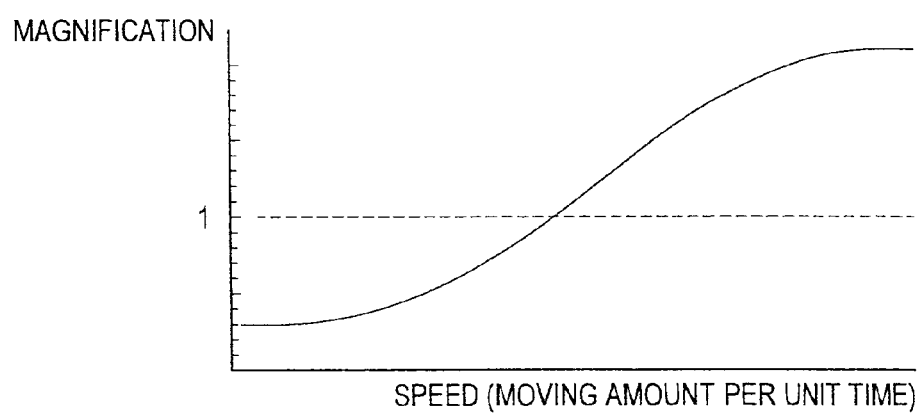
FIG. 15F is a graph showing a magnification of the object moving amount relative to the finger moving speed, which shows another example where the magnification of the object moving amount changes depending on the finger moving speed.

For the speed magnification distribution information of FIG. 15C, as shown in FIG. 15D, if the finger moving speed decreases beyond the equal magnification interval, the ratio of the longitudinal moving amount to the lateral moving amount may be decreased in a curved manner, and if the finger moving speed increases beyond the equal magnification interval, the ratio of the longitudinal moving amount to the lateral moving amount may be increased in a curved manner. Further, as shown in FIGS. 15E and 15F, the ratio of the longitudinal moving amount to the lateral moving amount may be increased or decreased in a curved manner relative to the finger moving speed. The speed magnification distribution information shown in FIGS. 15B to 15F are merely exemplary and other speed magnification distribution information may be used in the moving amount correction processing.

With the correction information, as the finger moving speed increases, the ratio of the longitudinal moving amount to the lateral moving amount increases. In other words, the ratio of the longitudinal moving amount to the lateral moving amount of the pointer 162 is larger than 1 when the finger moves by the unit moving amount. For example, it is assumed that both the longitudinal moving amount and the lateral moving amount of the pointer 162 are 10 for the finger's unit moving amount when the ratio of the longitudinal moving amount to the lateral moving amount is 1. Thereafter, when the finger moving speed increases and the ratio of the longitudinal moving amount to the lateral moving amount reaches 2, the longitudinal moving amount of the pointer 162 reaches 10 and the lateral moving amount thereof reaches 20. On the other hand, when the finger moving speed decreases and the ratio of the longitudinal moving amount to the lateral moving amount reaches 0.4, the longitudinal moving amount of the pointer 162 reaches 10 and the lateral moving amount thereof reaches 4.

In this manner, the ratio of the longitudinal moving amount to the lateral moving amount of the pointer 162 is changed depending on the change in the finger moving speed, so that bad operability due to the difference in the detection times depending on the moving direction can be improved. The upper limit of the ratio of the longitudinal moving amount to the lateral moving amount may be about twice as described above such that a feeling of strangeness will not occur due to the difference in the moving amounts of the pointer 162 in the longitudinal direction and in the lateral direction when the finger is moved by the same moving amount.

The operation amount correction processing may be performed by setting the correction information for correcting the moving amount of the pointer 162 for each finger movable direction. For example, for the movement in the vertical direction (the y direction) and the movement in the horizontal direction (the x direction) of the finger, the correction information for correcting the moving amount of the pointer 162 is set. Both the moving amounts in the vertical direction and in the horizontal direction of the pointer 162 may be changed depending on the finger moving speed. Thus, as the finger moving speed increases, both the longitudinal moving amount and the lateral moving amount of the pointer 162 increase. At this time, as described above, the correction information in each movable direction is generated such that as the finger moving speed increases, the lateral moving amount of the pointer 162 is larger than the longitudinal moving amount thereof. Therefore, similar effects to the above can be obtained.

(3. Correction of Object's Inertial Moving Amount Based on Finger Movement (Moving Direction and Speed))

Newt, the object's inertial moving amount correction processing based on a finger movement (moving direction and speed) by the input unit according to the embodiment will be described below with reference to FIG. 16. The moving amount correction based on the finger moving speed described above is a correction processing when the finger movement is detected by the sensor unit 220. To the contrary, the inertial moving amount correction processing is a correction processing when the state of the sensor unit 220 changes from the detectable state of the finger movement to the undetectable state, that is, when the input information is not present. The moving amount correction processing is directed for inertially moving the object depending on the moving amount or moving direction of the finger movement when the input into the sensor unit 220 is stopped.

Typically, when the input information for moving the object to be operated stops to be input into the sensor unit 220, the object stops its movement. However, for example, when the display contents displayed on the display region 160 are scrolled, if the scroll is stopped each time the input into the sensor unit 220 is stopped, the operability is deteriorated. Thus, when the input information into the sensor unit 220 is not present, if the speed detected by the sensor unit 220 immediately before the non-input state (which may be referred to as "speed just before non-input") is equal to or more than a predetermined speed, the object is moved also after the non-input state depending on the speed just before non-input.

As shown in FIG. 16, when a finger is present within the detection region of the optical pointing device 222 of the sensor unit 220, the input information is to be input, and in this state, the object is moved depending on the finger moving direction and moving amount detected by the sensor unit 220. On the other hand, when the finger is out of the detection region of the optical pointing device 222, the input information is not input into the sensor unit 220. At this time, the moving control unit 120 which detects that the input information is not present in the input device 200 determines whether the speed just before non-input is equal to or more than a predetermined speed. Then, when it is determined that the speed just before non-input is equal to or more than the predetermined speed, the moving control unit 120 moves the object also after the input information is not present.

The object moving speed after the input information is not present may be linearly decreased from the speed just before non-input $v_1$ and may be corrected to be zero after a predetermined time is elapsed as indicated in pattern 1 of FIG. 16, for example. Alternatively, as indicated in pattern 2, the object moving speed may be decreased from the speed just before non-input $v_2$ in a curved manner and may be corrected to be zero after a predetermined time is elapsed. The object moving speed after the input information is not present may be preset, for example, and may be determined based on the change in the object moving speed when the input information is present. In this manner, the object is inertially moved according to the finger operation even after the input information is not present so that the smooth movement of the object can be realized.

Further, for example, when an operation of designating one point on the screen and rapidly flicking the point in an arbitrary direction (which is referred to as "flick" below) is performed on the operation panel 224 of the input device 200 according to the embodiment, it is easy to flick in the lateral direction but difficult to flick in the longitudinal direction due to thumb's characteristics. The attenuation time until the object moving speed reaches zero after the input information stops being input at the time of the flicking in the longitudinal direction may be set to be longer than at the time of the flicking in the lateral direction based on the inertial moving amount correction processing. In other words, the operation control unit 120 may correct the attenuation time to be longer when the finger moving direction just before non-input is the longitudinal direction than when being the lateral direction, thereby further improving the operability.

The object moving amount correction processing based on the input information has been described above. In this manner, the object moving amount is corrected thereby to improve the operability and to reduce user's fatigue during the operation. The three moving amount correction controls described above may be applied alone or together.

[Operation Control for Highlighted Item]

Figure 17:
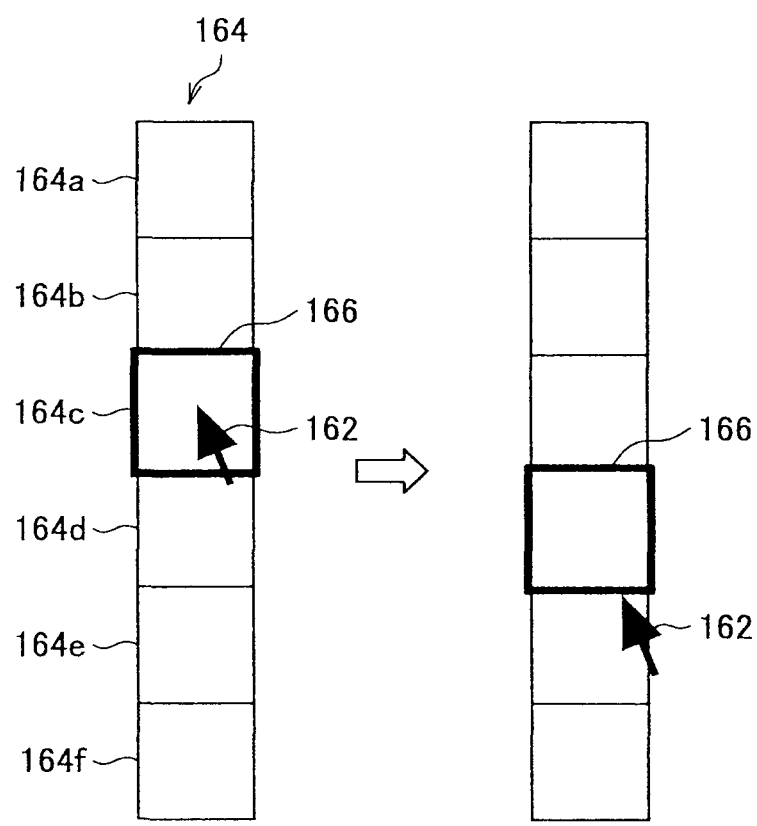
FIG. 17 is an explanatory diagram for describing an object selecting operation on highlighted items.
Figure 18:
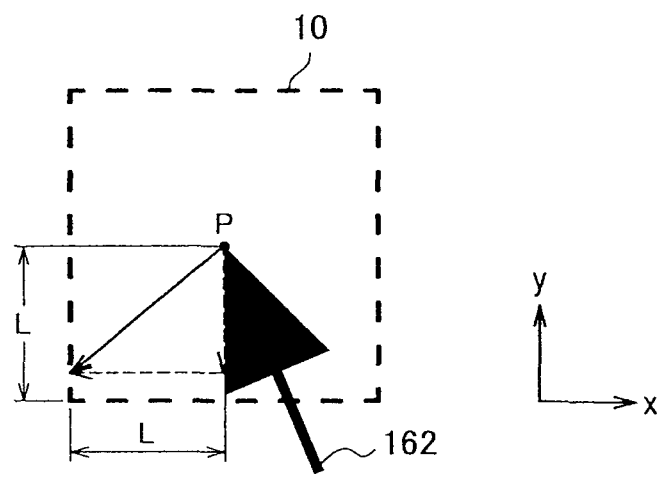
FIG. 18 is an explanatory diagram for describing a typical deciding method for deciding an object to be selected from among highlighted items.
Figure 19:
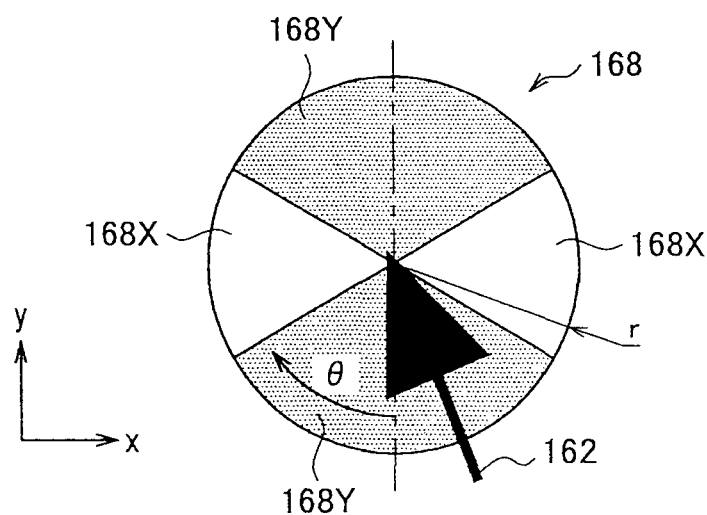
FIG. 19 is an explanatory diagram for describing a deciding method for deciding an object to be selected from among highlighted items according to the embodiment.
Figure 20:
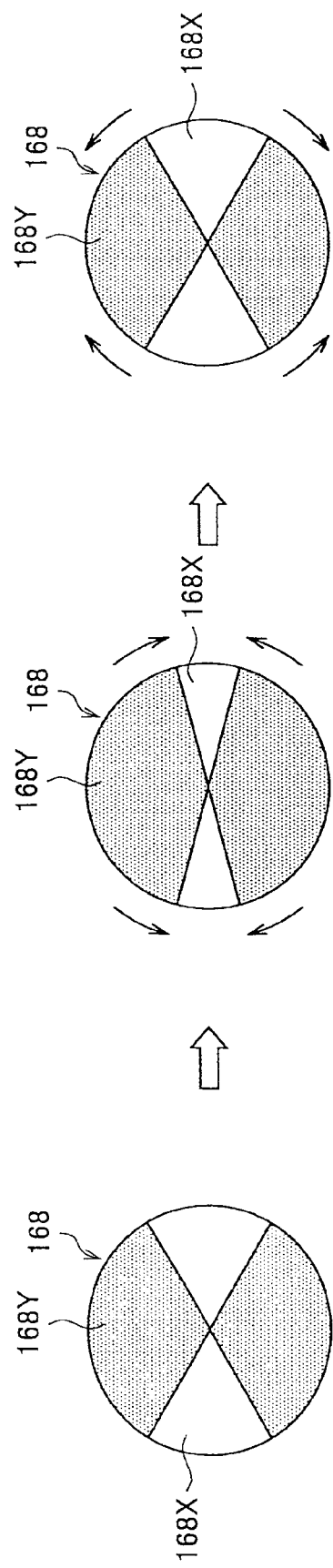
FIG. 20 is an explanatory diagram showing changes in longitudinal recognition regions and lateral recognition regions.
Figure 21:
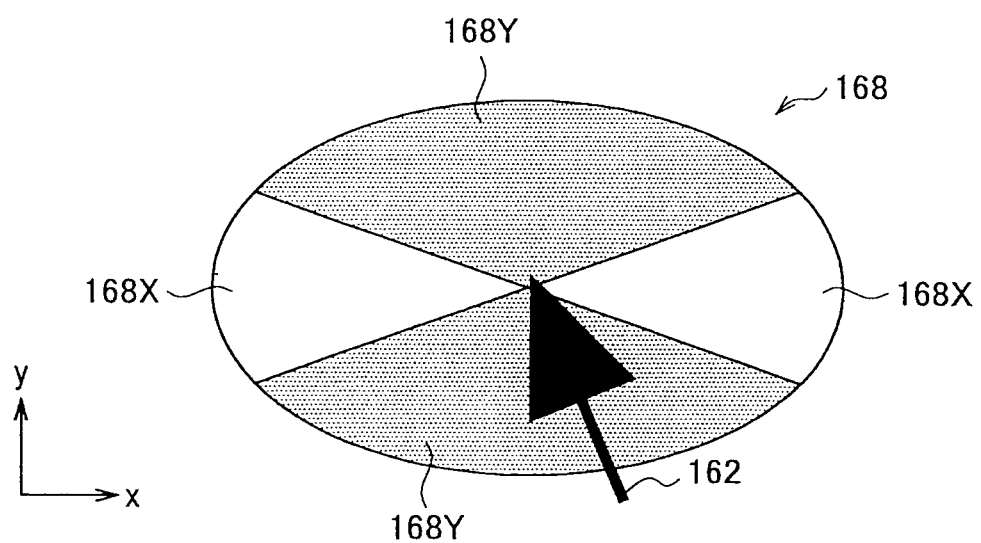
FIG. 21 is an explanatory diagram showing another example of the recognition region.
Figure 22:
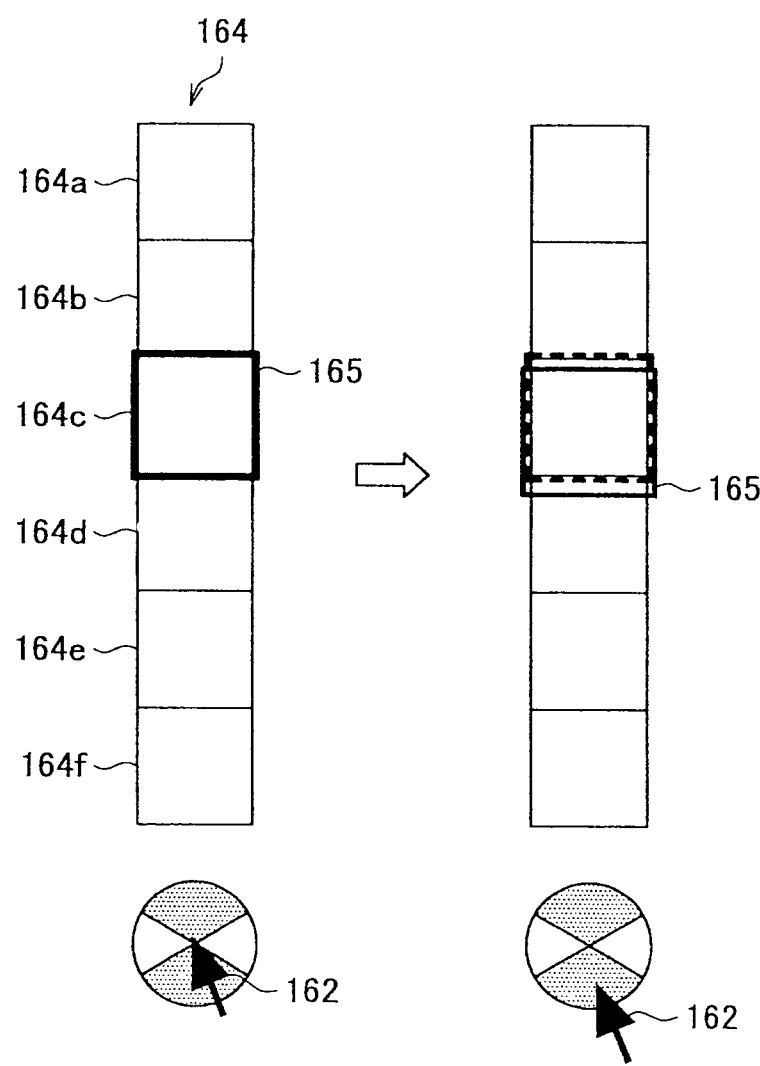
FIG. 22 is an explanatory diagram showing a state where a highlighted position among the highlighted items is moved according to a finger movement.

The operation controlling method for highlighted items by the input unit according to the embodiment will be described below with reference to FIGS. 17 to 22. FIG. 17 is an explanatory diagram for describing an object selecting operation on the highlighted items. FIG. 18 is an explanatory diagram for describing a typical deciding method for deciding an object to be selected from among highlighted items. FIG. 19 is an explanatory diagram showing the deciding method for deciding an object to be selected from among the highlighted items according to the embodiment. FIG. 20 is an explanatory diagram showing the changes in the longitudinal recognition regions and in the lateral recognition regions. FIG. 21 is an explanatory diagram showing another example of the recognition region. FIG. 22 is an explanatory diagram showing a state where a highlighted position in the highlighted items is moved along with the finger movement.

In the embodiment, the highlighted items are a group of objects configured of several objects to be selected, and are indicated by displaying the selected object in a highlighted manner. The highlighted items include a group of objects 164 in which several objects 164a to 164f are arranged in a line as shown in FIG. 17, for example. Typically, the highlighted position 166 (second object) displayed in a highlighted manner in the highlighted items is moved in units of object depending on the movement of the pointer 162 (object). For example, the highlighted position 166 in the six objects 164a to 164f shown in FIG. 17 is moved by one object when the pointer 162 is moved by predetermined distance.

When the operation for the highlighted item is performed in the input device 200 according to the embodiment, the thumb is moved on the operation panel 224 described above, thereby inputting the input information for moving the highlighted position 166.

The method for deciding the highlighted position 166 typically used is directed for assuming the direction in which the detection point P of the pointer 162 displayed within the display region is moved by predetermined distance L in the longitudinal direction (the y direction) or in the lateral direction (the x direction) as the moving direction of the highlighted position 166 as shown in FIG. 18. For example, when the pointer 162 is obliquely moved to the left as shown in FIG. 18, the moving direction of the highlighted position 166 in which the moving distance in the x direction is L is determined to be the lateral direction.

When the input device 200 according to the embodiment is used to operate the highlighted position 166, the thumb can move substantially linearly in the horizontal direction as described above, but may not move linearly in the vertical direction and is difficult to move linearly. Therefore, when the highlighted position 166 is moved from top down, for example, though the thumb is moved from top down on the operation panel 224, the thumb is actually moved obliquely. Thus, when the highlighted position 166 is moved by the above typical method, the operation of moving the highlighted position 166 in the vertical direction may be erroneously recognized as the operation of moving the highlighted position 166 in the horizontal direction. In this manner, the highlighted position 166 may be moved in a different direction from the desired direction depending on the input information.

In order to prevent the erroneous recognition, the highlighted position 166 is moved in consideration of the moving angle of the pointer 162 in the embodiment. Specifically, the moving control unit 120 determines the moving direction of the highlighted position 166 based on the moving direction (that is, moving angle θ) when the pointer 162 is moved by predetermined distance r. The moving direction deciding method will be described with reference to FIG. 19.

As shown in FIG. 19, the recognition region 168 for deciding the moving direction of the highlighted position 166 is set around the pointer 162. The recognition region 168 of FIG. 19 is a circle having the radius r and is divided into two lateral recognition regions 168X and two longitudinal recognition regions 168Y by four boundaries passing through the center of the circle. The lateral recognition region 168X is directed for recognizing the moving amount in the lateral direction from the moving amount of the pointer 162 and the longitudinal recognition region 168Y is directed for recognizing the moving amount in the longitudinal direction from the moving amount of the pointer 162. The two lateral recognition regions 168X are symmetrically provided in the x direction relative to the center of the recognition region 168 and the two longitudinal recognition regions 168Y are symmetrically provided in the y direction relative to the center of the recognition region 168.

The moving control unit 120 decides the moving direction of the highlighted position 166 based on which region of the longitudinal recognition regions 168Y and the lateral recognition regions 168X in the recognition region 168 the pointer 162 is present in when the pointer 162 is moved by r. In other words, if the moving direction of the pointer 162 is within the range of 0° to ±0 relative to the line parallel to the y direction passing through the center of the recognition region 168, the highlighted position 166 is moved in the vertical direction. On the other hand, if the moving direction of the pointer 162 is within the range of 0° to ±90 relative to the line parallel in the y direction passing through the center of the recognition region 168, the highlighted position 166 is moved in the horizontal direction. In this way, the moving direction of the highlighted position 166 is decided in consideration of the moving angle, so that the moving direction of the pointer 162 is associated with the direction in which the highlighted position 166 is desirably moved, thereby reducing erroneous operations.

The lateral recognition regions 168X and the longitudinal recognition regions 168Y can be arbitrarily set but the longitudinal recognition regions 168Y are set to be larger than the lateral recognition regions X as shown in FIG. 19 in the present embodiment. This is because the thumb may not smoothly move in the longitudinal direction due to the operational characteristics of the used input device 200 and the thumb and thus the range in which the moving direction of the highlighted position 166 is recognized as the vertical direction is set to be wide thereby to allow an offset in the moving direction due to instability during the operation. Thus, since the moving direction of the highlighted position 166 can be recognized as the vertical direction even if the moving direction of the thumb in the vertical direction is inclined relative to the vertical direction of the input device 200, the operability of the input device 200 can be improved.

The setting of the recognition region 168 may be changed depending on the operation state of the thumb in order to easily detect the thumb movement in the longitudinal direction. For example, as shown in FIG. 20, when the movement of the thumb in the longitudinal direction is detected in the initial state (left diagram) of the recognition region, the ratio of the longitudinal recognition regions 168Y is increased in the recognition region 168 in order to easily detect the movement in the longitudinal direction (middle diagram). When the movement of the thumb in the longitudinal direction is continuously detected a predetermined number of times or more or for a predetermined time or more, the user can estimate that the highlighted position 166 is desired to be largely moved in the longitudinal direction. In this case, the ratio of the recognition region 168 is changed and the movement of the thumb is set to be easily recognized as the movement in the longitudinal direction, thereby reducing erroneous recognitions and easily performing the same operation continuously. The ratio of the recognition region 168 may be changed so that the center angle of the longitudinal recognition regions 168Y is larger than in the initial state as indicated at the center of FIG. 20 and the entire recognition region 168 may be assumed as the longitudinal recognition region 168Y.

When the input information is not input for a predetermined time or more after the ratio of the recognition region 168 is changed or when the movement of the thumb in the lateral direction is detected, the ratio of the recognition region 168 is returned to the initial state (right diagram). The ratio of the recognition region 168 is returned to the initial state when the same operation has not been continuously performed, thereby releasing the state where the moving direction to be detected in the region having a small ratio of the recognition region 168 is difficult to detect.

The recognition region 168 may be set depending on the moving angle when the pointer 162 is moved by unit distance as described above, or the moving distance of the pointer 162 when the longitudinal direction is recognized may be set to be larger than the lateral direction is recognized as shown in FIG. 21. Thus, the longitudinal direction is more easily detected than the case of FIG. 19.

The highlighted item moving control described above can allow the highlighted position 166 in the highlighted items to move along with the finger movement as shown in FIG. 22. As described above, typically the highlighted position 166 in the highlighted items is gradually moved in units of object. The highlighted position 166 is continuously moved by directly feeding back the finger movement, thereby notifying the user of the association between the finger moving direction and the moving direction of the highlighted position 166.

In order to continuously move the highlighted position 166, for example, the finger moving direction and moving distance are first acquired and the unit distance in the finger moving direction is acquired in the recognition region 168. Next, a ratio of the actual finger moving distance to the unit distance in the recognition region 168 is decided. When the highlighted position 166 is gradually moved, the highlighted position 166 is moved by the unit object each time the finger is moved by the unit distance in the recognition region 168. Then, the highlighted position 166 is moved by the distance between the unit objects according to the ratio for the unit distance, thereby realizing the continuous movement of the highlighted position 166. In other words, as shown in the right diagram of FIG. 22, the highlighted position 166 is moved according to the finger moving distance also before the pointer 162 is moved by the unit distance in the recognition region 168.

The operation control for the highlighted items has been described above. The operation control is effective for using the input means having a loose longitudinal and lateral limitation during the input operation like the input form of the sensor unit 220 in the input device 200 according to the embodiment. For example, the operation control can be applied for holding the input device in a hand and moving the same in a 3D space to perform gesture input. In this case, the positional information (3D coordinate) on the input device is acquired by a gyro sensor or the like, and the direction in which the object is moved can be decided by a gesture based on the moving direction and the unit distance in the recognition region set for the 3D space as described above.

Further, the operation control is applicable to a UI having a limitation on the moving direction (for example, a movable thing only in the longitudinal direction or lateral direction) such as scroll operation of the display contents other than the movement of the highlighted position in the highlighted items.

The configuration and function of the input unit according to the embodiment of the present invention have been described above. With the input unit according to the embodiment, the operation control unit 120 changes the object moving amount for the finger's unit moving amount according to the finger moving direction on the operation panel. Thus, the object moving amount is corrected in consideration of the shape of the display region in which the object is moved or finger's operation characteristics, thereby enhancing the operability.

The input unit according to the embodiment decides the moving direction of the second object which moves according to the movement of the object such as the movement of the highlighted position in the highlighted items based on the object moving direction (moving angle) and moving amount. The moving direction of the second object is decided in consideration of the moving angle, so that the second object can be moved in a desired direction even if the moving direction of the object is offset, thereby reducing erroneous operations.

The input unit according to the embodiment sets the shape of the operation panel 224 of the sensor unit 220 in the input device 200 to be curved viewed from the section parallel to the vertical direction of the input device 200 and to be flat and linear viewed from the section parallel to the horizontal direction. Thus, the thumb which operates the operation panel can move along the curved face of the operation panel in the vertical direction and can be easily moved linearly. Thereby, the finger moving direction easily matches with the object moving direction, thereby reducing erroneous recognition in the moving direction.

The preferred embodiment of the present invention has been described above with reference to the appended drawings but the present invention is not limited to the example. It should be understood by those skilled in the art that various modifications, combinations, sub-combinations and alterations may occur depending on design requirements and other factors insofar as they are within the scope of the appended claims or the equivalents thereof.

For example, in the above embodiment, the input device 200 includes the two functions such as mouse mode and air mode, but the present invention is not limited to the example. For example, there may be employed a remote controller on which the mouse mode is not mounted and which includes the sensor unit 220 in the input device 200 according to the embodiment.

What is claimed is:

1. An information processing apparatus comprising:
   circuitry configured to
   receive an input to operate an object in at least a first direction and a second direction by a user;
   detect a speed of the input; and
   control to display the object to move on a display screen;
   wherein the object is inertially moved after the input is not present depending on a speed just before the input is not detected, and
   wherein an attenuation time of inertial movement of the object until a moving speed of the object reaches zero is adjusted so that at a time of the input in the first direction is set to be relatively longer than at a time of the input in the second direction.

2. The information processing apparatus according to claim 1, wherein the input includes a flicking operation at a point in an arbitrary direction performed on an operation panel by the user.

3. The information processing apparatus according to claim 1, wherein
   the input is a finger movement, and
   the object is inertially moved depending on at least one of a moving amount and a moving direction of the finger movement when the input is stopped.

4. The information processing apparatus according to claim 1, wherein if a speed detected immediately before the input stops is equal to or more than a predetermined speed, the object is moved depending on a speed just before the input is not detected.

5. The information processing apparatus according to claim 1, wherein the circuitry is configured to change a moving amount of the object based on a movable distance in a movable direction of the object in a display region of the display screen.

6. The information processing apparatus according to claim 1, wherein the circuitry is configured to change a ratio of a moving amount of the object depending on the speed.

7. The information processing apparatus according to claim 1, wherein the circuitry is configured to decide a moving direction of a second object moving in a predetermined direction depending on the movement of the object based on at least one of a moving amount and a moving direction of the object.

8. The information processing apparatus according to claim 7, wherein the circuitry is configured to:
   set moving direction recognition regions by the moving direction and the moving amount of the object, respectively, for the moving direction of the second object, and
   change the moving direction recognition regions depending on a moving status of the second object.

9. An information processing method comprising the steps of:
   receiving an input to operate an object in at least a first direction and a second direction by a user;
   detecting a speed of the input;
   displaying the object to move on a display screen;
   moving the object inertially after the input is not present depending on a speed just before the input is not detected; and
   adjusting an attenuation time of inertial movement of the object until a moving speed of the object reaches zero so that at a time of the input in the first direction is set to be relatively longer than at a time of the input in the second direction.

10. The information processing method according to claim 9, wherein the input includes a flicking operation at a point in an arbitrary direction performed on an operation panel by the user.

11. The information processing method according to claim 9, wherein
    the input is a finger movement, and
    moving the object inertially includes moving the object inertially depending on at least one of a moving amount and a moving direction of the finger movement when the input is stopped.

12. The information processing method according to claim 9, wherein if a speed detected immediately before the input stops is equal to or more than a predetermined speed, moving the object includes moving the object depending on a speed just before the input is not detected.

13. The information processing method according to claim 9, further comprising changing a moving amount of the object based on a movable distance in a movable direction of the object in a display region of the display screen.

14. The information processing method according to claim 9, further comprising changing a ratio of a moving amount of the object depending on the speed.

15. The information processing method according to claim 9, further comprising deciding a moving direction of a second object moving in a predetermined direction depending on the movement of the object based on at least one of a moving amount and a moving direction of the object.

16. The information processing method according to claim 15, further comprising:
- setting moving direction recognition regions by the moving direction and the moving amount of the object, respectively, for the moving direction of the second object, and
- changing the moving direction recognition regions depending on a moving status of the second object.

17. An information processing apparatus comprising:
circuitry configured to
- receive an input to operate an object in at least a first direction and a second direction by a user; and
- control to display the object to move on a display screen;
- wherein the object is inertially moved after the input is not present depending on a speed just before the input is not detected, and
- wherein an attenuation time of inertial movement of the object until a moving speed of the object reaches zero is adjusted so that at a time of the input in the first direction is set to be relatively longer than at a time of the input in the second direction.

18. A non-transitory computer readable medium storing instructions, which when executed cause a computer to perform a method, the method comprising:
- receiving an input to operate an object in at least a first direction and a second direction by a user;
- displaying the object to move on a display screen;
- moving the object inertially after the input is not present depending on a speed just before the input is not detected; and
- adjusting an attenuation time of inertial movement of the object until a moving speed of the object reaches zero so that at a time of the input in the first direction is set to be relatively longer than at a time of the input in the second direction.

* * * * *